United States Patent
Umeda et al.

(10) Patent No.: US 9,542,594 B2
(45) Date of Patent: Jan. 10, 2017

(54) INFORMATION PROCESSING APPARATUS, METHOD FOR PROCESSING INFORMATION, AND PROGRAM

(71) Applicant: CANON KABUSHIKI KAISHA, Tokyo (JP)

(72) Inventors: Kiyoshi Umeda, Kawasaki (JP); Hiroyasu Kunieda, Yokohama (JP); Wakako Tanaka, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 13 days.

(21) Appl. No.: 14/313,853

(22) Filed: Jun. 24, 2014

(65) Prior Publication Data

US 2015/0003680 A1    Jan. 1, 2015

(30) Foreign Application Priority Data

Jun. 28, 2013   (JP) ................................. 2013-137060

(51) Int. Cl.
  *G06K 9/00* (2006.01)
  *G06T 7/00* (2006.01)
  *G06K 9/62* (2006.01)

(52) U.S. Cl.
  CPC ....... *G06K 9/00228* (2013.01); *G06K 9/00677* (2013.01); *G06K 9/6256* (2013.01); *G06T 7/004* (2013.01)

(58) Field of Classification Search
  CPC .............. G06K 9/00228; G06K 9/6256; G06K 9/00677; G06T 7/004; G06T 7/0042
  See application file for complete search history.

(56) References Cited

U.S. PATENT DOCUMENTS

2008/0232650 A1*  9/2008  Suzuki ............... G06K 9/00281
                                                              382/118
2013/0113941 A1*  5/2013  Yoneyama ............. H04N 5/232
                                                              348/169

FOREIGN PATENT DOCUMENTS

| JP | 05-197793 A | 8/1993 |
| JP | 08-63597 A | 3/1996 |
| JP | 08-77334 A | 3/1996 |
| JP | 2541688 B2 | 10/1996 |
| JP | 3469031 B2 | 9/1998 |
| JP | 11-53525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 2008-305275 A | 12/2008 |
| JP | 2010-251999 A | 11/2010 |
| JP | 2010-273144 A | 12/2010 |

* cited by examiner

*Primary Examiner* — Jon Chang
(74) *Attorney, Agent, or Firm* — Canon U.S.A., Inc. IP Division

(57) ABSTRACT

Positional information regarding a target region in an image obtained by a first detection unit is obtained from a holding unit, and positional information regarding a target region in the image is obtained by a second detection unit whose detection characteristics are different from those of the first detection unit. Positional information regarding a target region in the image is determined based on the obtained positional information and the positional information detected by the second detection unit.

25 Claims, 25 Drawing Sheets

FIG. 17A

| DICTIONARY ID | PERSON ID | FACE FEATURE QUANTITIES |
|---|---|---|
| 1 | No name 1 | ▨ ▨ ▨ ▨ ⋯ |
| 2 | No name 2 | ▨ ▨ ▨ ▨ ⋯ |
| 3 | No name 3 | ▨ |
| 4 | No name 4 | ▨ ▨ |
| 5 | No name 5 | ▨ ▨ |
| 6 | No name 6 | ▨ ▨ ▨ |
| ⋮ | ⋮ | ⋮ |
|  |  |  |

| DICTIONARY ID | PERSON ID | FACE FEATURE QUANTITIES |
|---|---|---|
| 1 | father | ▨ ▨ ▨ ▨ ⋯ — 2304 |
| 2 | son | ▨ ▨ ▨ ▨ ⋯ |
| 3 | mother | ▨ |
| 4 | No name 4 | ▨ ▨ |
| 5 | No name 5 | ▨ ▨ |
| 6 | No name 6 | ▨ ▨ ▨ |
| ⋮ | ⋮ | ⋮ |
|  |  |  |

2301, 2302, 2303

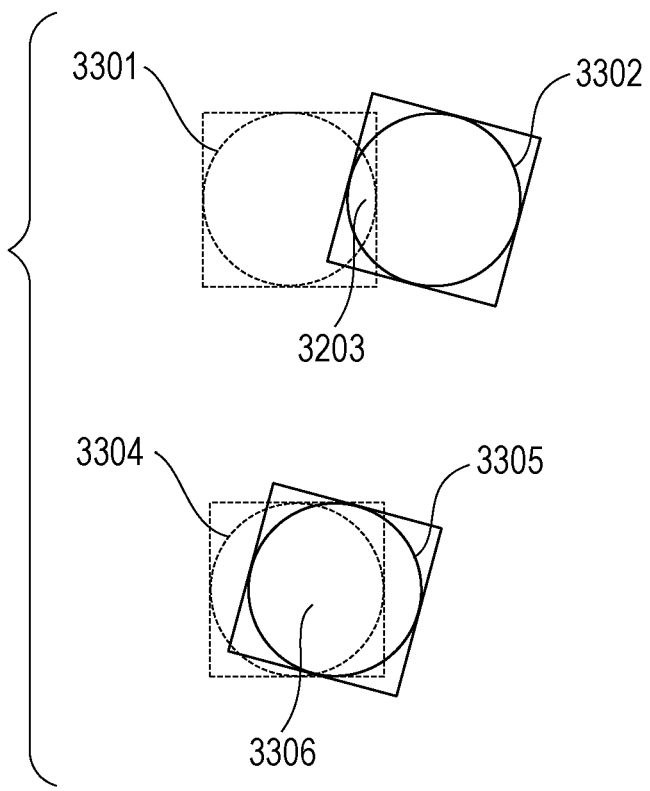

INFORMATION PROCESSING APPARATUS, METHOD FOR PROCESSING INFORMATION, AND PROGRAM

BACKGROUND OF THE INVENTION

Field of the Invention

The present invention relates to an information processing apparatus that processes positional information detected by a detection unit and a method for processing information by which positional information detected by the detection unit is processed.

Description of the Related Art

A method has been proposed in which persons' faces are detected in images captured by a digital still camera (also referred to as a DSC hereinafter) or a multifunctional mobile phone having a camera function and various types of image processing are performed based on information regarding the faces (Japanese Patent Laid-Open No. 2008-305275).

In Japanese Patent Laid-Open No. 2008-305275, persons' faces are detected in a plurality of images when the plurality of images are automatically arranged in a layout template, and the plurality of images are appropriately arranged in the existing layout template based on the positions of the faces. A reference layout point is set in each arrangement frame, and a desirable layout can be automatically generated by combining the reference layout point with each of the positions of the faces.

In addition, a method is known in which a process for analyzing the background, such as face detection and person identification, is automatically performed on images saved in a personal computer (PC) without bothering a user.

The above-described image processing may be realized, for example, by applications or the like.

However, the performance of various techniques such as face detection can be further improved over time. In addition, in these years, the main operating environments of applications have been rapidly changing from PCs to multifunction mobile phones, and the image processing is often performed on servers connected to networks. Therefore, it is desired to optimize the operation of applications in accordance with the operating environments.

Thus, the functions of applications or the like might be updated. For example, when a process for detecting objects has been updated, a problem arises in terms of treatment of detected positions saved in a database of a local PC by a previous object detection unit and newly detected positions output by a current object detection unit.

SUMMARY OF THE INVENTION

Aspects of the present invention provide an information processing apparatus and a method for processing information that solve the above problem. Other aspects of the present invention provide an information processing apparatus, a method for processing information, and a program that can determine positional information regarding a target region in an image based on positional information regarding the target regions in the image detected by a plurality of detection units.

An aspect of the information processing apparatus in the present invention includes an obtaining unit configured to obtain, from a holding unit, positional information regarding a target region in an image obtained by a first detection unit, a second detection unit configured to have detection characteristics different from detection characteristics of the first detection unit and detect positional information regarding a target region in the image, and a determination unit configured to determine positional information regarding a target region in the image based on the positional information obtained by the obtaining unit and the positional information detected by the second detection unit.

Further features of the present invention will become apparent from the following description of exemplary embodiments with reference to the attached drawings.

BRIEF DESCRIPTION OF THE DRAWINGS

FIGS. 17A and 17B are diagrams illustrating the configurations of a face dictionary.

FIG. 25 is a diagram illustrating a process for determining whether regions substantially match according to another embodiment.

DESCRIPTION OF THE EMBODIMENTS

A first embodiment, which is a desirable embodiment of the present invention, will be described hereinafter in terms of automatic generation of a layout output using input images. This is just an exemplary embodiment, and the present invention is not limited to the following embodiment.

First Embodiment

Figure 1:
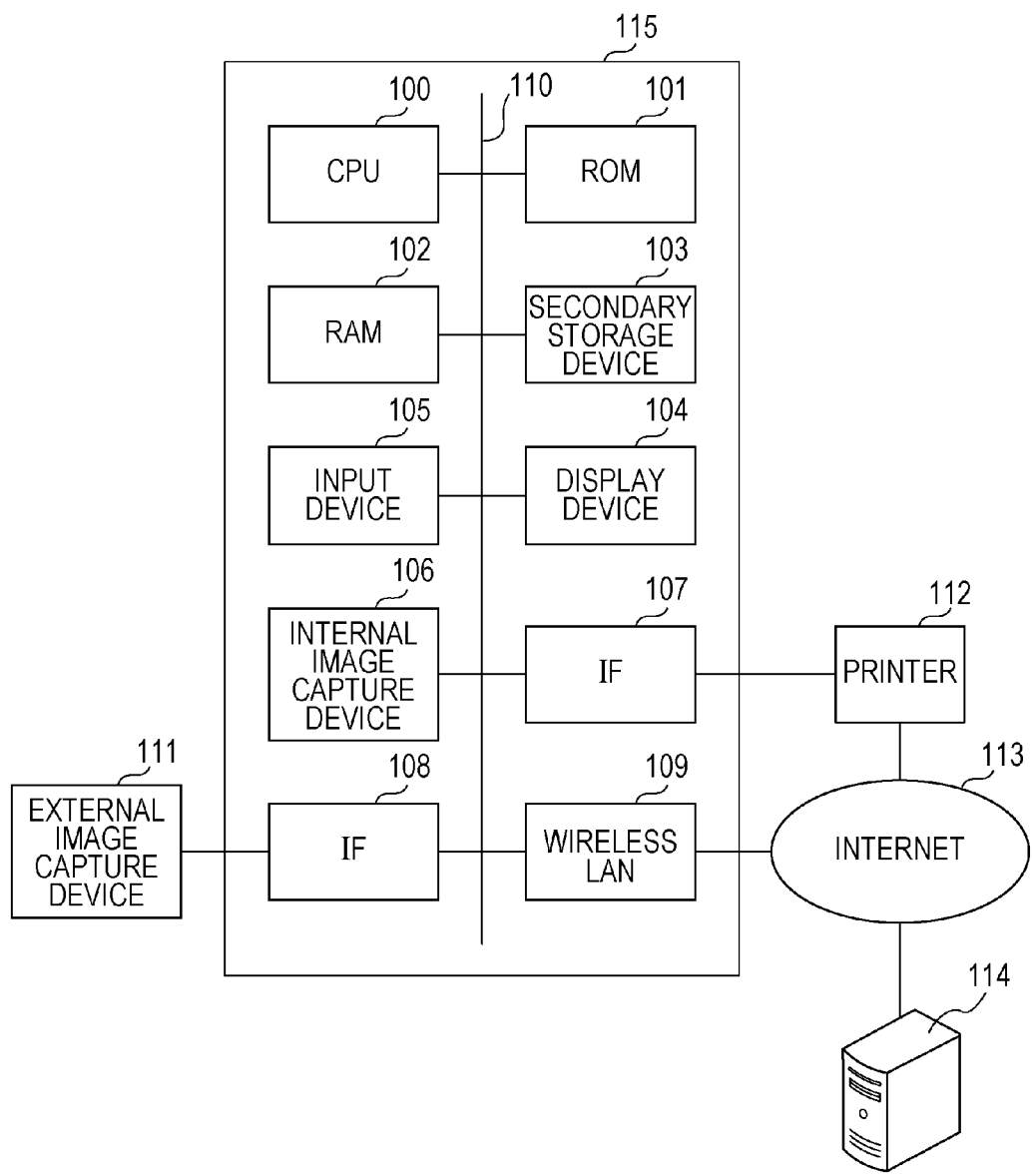
FIG. 1 is a diagram illustrating the hardware configuration of an image processing apparatus according to a first embodiment.

FIG. 1 is a block diagram illustrating an example of the hardware configuration of an image processing apparatus according to the first embodiment.

In FIG. 1, an information processing apparatus 115 includes a central processing unit (CPU) 100, a read-only memory (ROM) 101, a random-access memory (RAM) 102, a secondary storage device 103, a display device 104, an input device 105, an interface (IF) 107, an IF 108, and a wireless local area network (LAN) 109. Furthermore, an internal image capture device 106 is included. These components are connected to one another by a control bus/data bus 110. The information processing apparatus 115 according to this embodiment functions as an image processing apparatus.

The information processing apparatus 115 is, for example, a computer. The CPU 100 executes information processing that will be described in the first embodiment in accordance with programs. The ROM 101 stores the programs executed by the CPU 100, such as applications that will be described later. The RAM 102 provides a memory for temporarily storing various pieces of information when the CPU 100 executes the programs. The secondary storage device 103 is a hard disk or the like, and is a storage medium for saving a database or the like in which image files and results of image analyses are saved. The display device 104 is, for example, a display, and is a device that displays results of processing in the first embodiment, UIs that will be described later, and the like for a user. The CPU 100 controls the entirety of the information processing apparatus 115 by loading a program stored in the ROM 101, the secondary storage device 103, or the like into the RAM 102 and executing the loaded program.

The display device 104 may have a touch panel function. The input device 105 is a mouse, a keyboard, or the like for enabling the user to input an instruction to perform a process for correcting an image or the like.

In addition, an image captured by the internal image capture device 106 is subjected to certain image processing, and then stored in the secondary storage device 103. In addition, the information processing apparatus 115 is capable of reading image data from an external image capture device 111 connected through an interface (IF 108). Furthermore, the wireless LAN 109 is connected to the Internet 113. The information processing apparatus 115 is also capable of obtaining image data from an external server 114 connected to the Internet 113.

A printer 112 for outputting an image or the like is connected to the information processing apparatus 115 through the IF 107. It is to be noted that the printer 112 is connected to the Internet 113, and can communicate print data through the wireless LAN 109.

Figure 2:
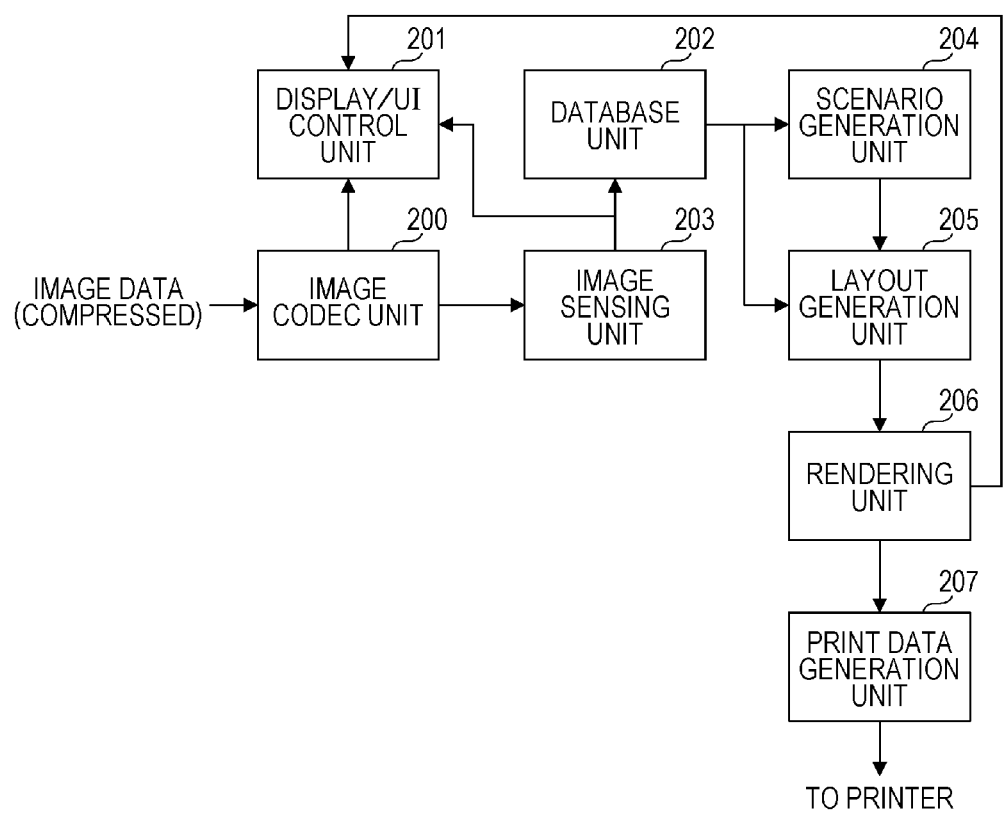
FIG. 2 is a block diagram illustrating software according to the first embodiment.

FIG. 2 is a block diagram illustrating the software configuration of the applications or the like according to this embodiment.

First, image data obtained by hardware has a compressed format such as Joint Photographic Experts Group (JPEG). Therefore, an image codec unit 200 converts the image data into a so-called RGB dot-sequential bitmap data format by decompressing the compressed format. Bitmap data obtained as a result of the conversion is transmitted to a display/UI control unit 201, and displayed on the display device 104 such as a display.

The bitmap data is also input to an image sensing unit 203 (application), and subjected to a process for analyzing images in various ways, which will be described in detail later. Various pieces of attribute information regarding the image obtained as a result of the analysis process are saved in the above-described secondary storage device 103 by a database unit 202 in accordance with a certain format. It is to be noted that the image analysis process and a sensing process are synonymous in the following description.

A scenario generation unit 204 (application) generates, in accordance with various conditions input by the user, conditions of layouts to be automatically generated. A layout generation unit 205 (application) performs a process for automatically generating layouts in accordance with this scenario.

A rendering unit 206 generates bitmap data regarding the generated layouts for display purposes, and transmits the bitmap data to the display/UI control unit 201. Results are displayed on the display device 104 such as a display. On the other hand, the results of the rendering are also transmitted to the print data generation unit 207. The results of the rendering are converted into command data for the printer 112, and transmitted to the printer 112.

Figure 3:
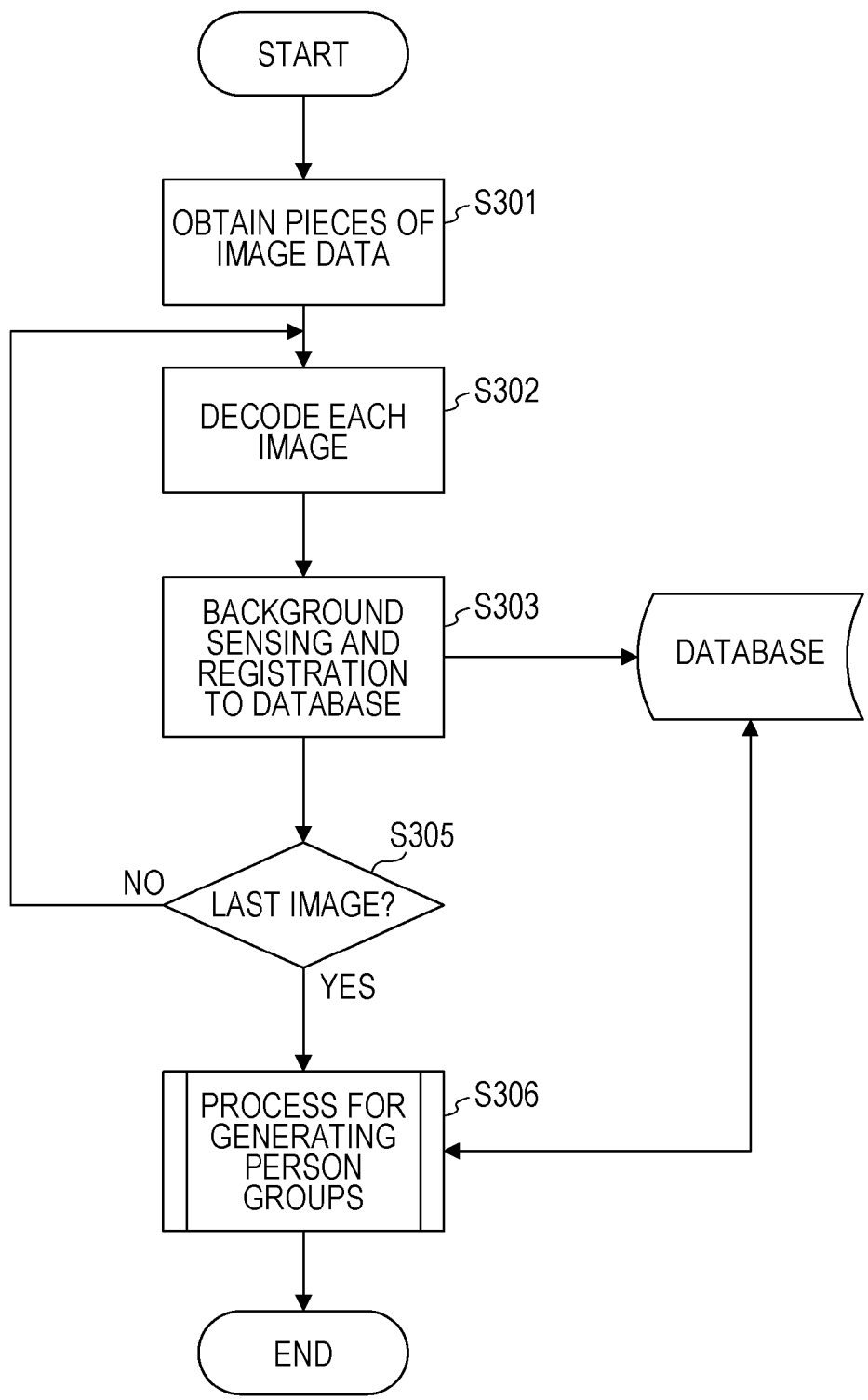
FIG. 3 is a flowchart illustrating a process for analyzing images according to the first embodiment.
Figure 4:
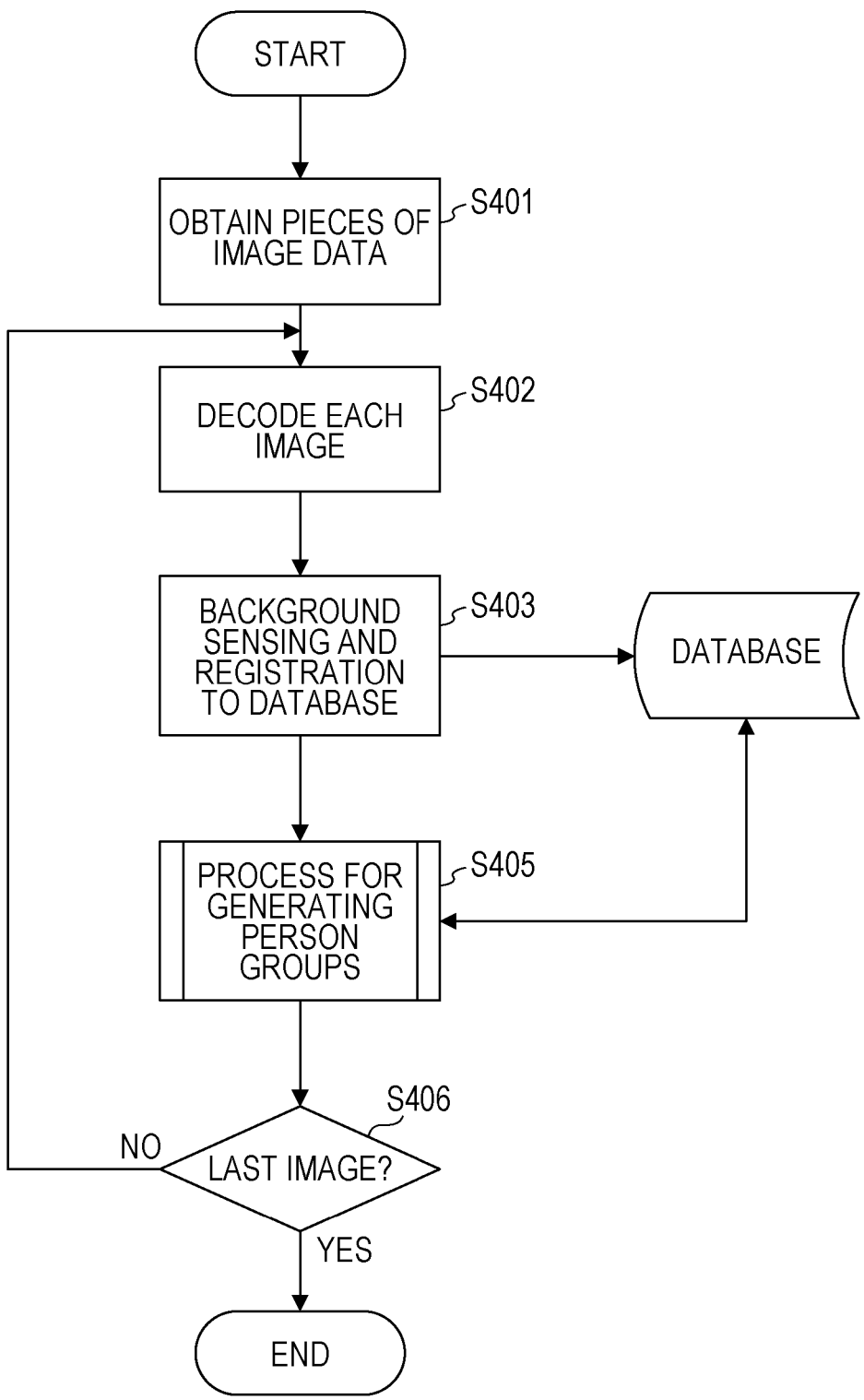
FIG. 4 is a flowchart illustrating another process for analyzing images according to the first embodiment.
Figure 5:
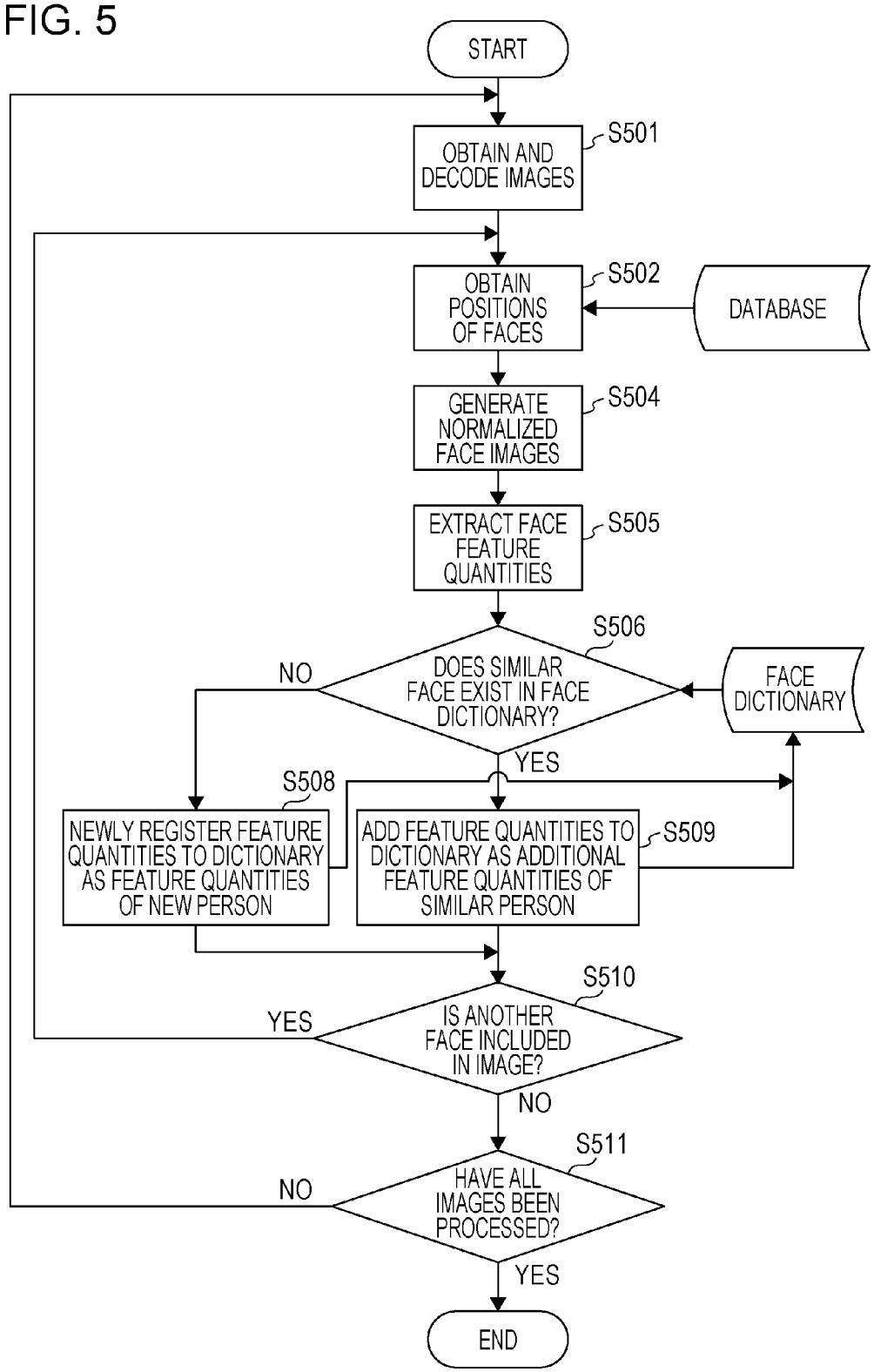
FIG. 5 is a flowchart illustrating a process for generating person groups according to the first embodiment.
Figure 6:
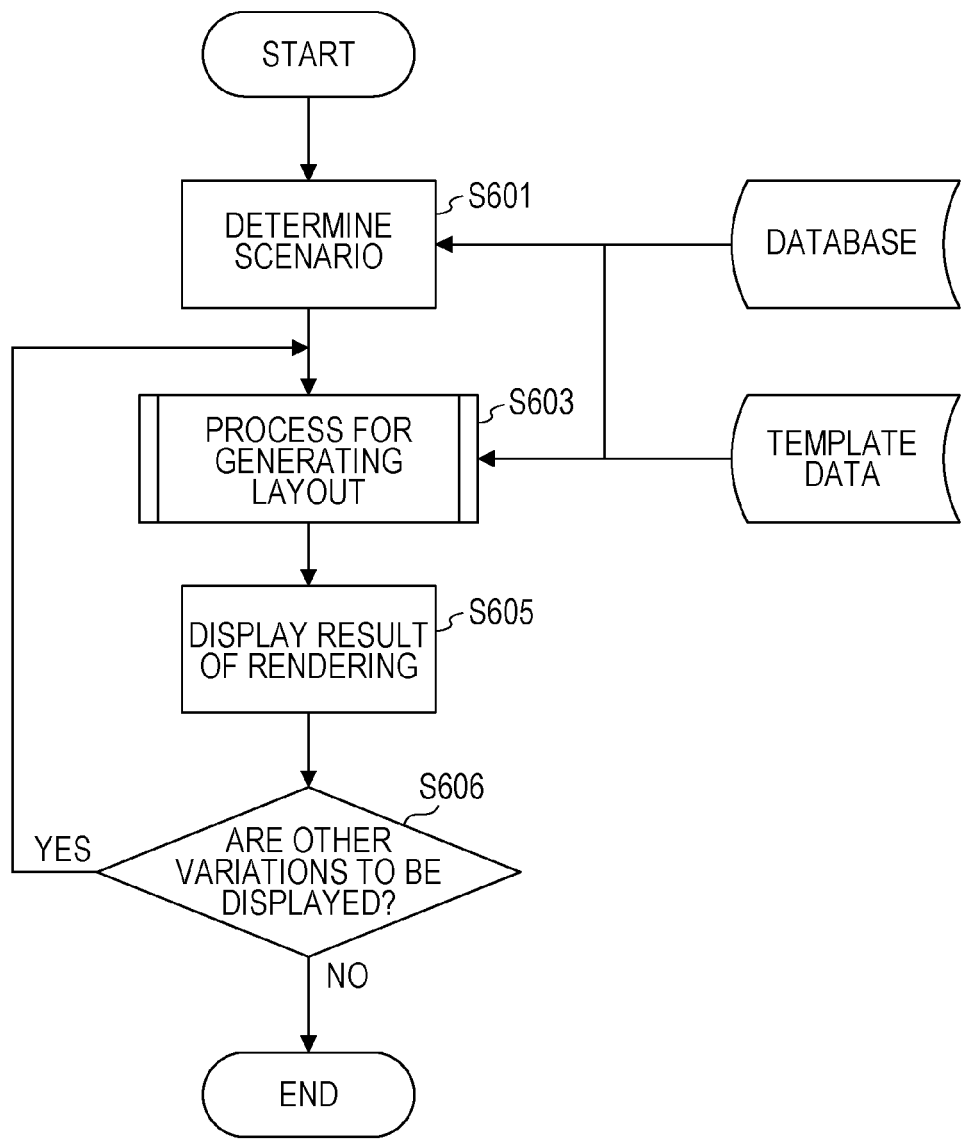
FIG. 6 is a flowchart illustrating a process for automatically suggesting layouts according to the first embodiment.

FIGS. 3 to 6 are flowcharts illustrating basic image processing performed by the applications according to this embodiment. More specifically, FIGS. 3 and 4 illustrate procedures performed by the image sensing unit 203, in which a plurality of pieces of image data are obtained and subjected to the analysis process, and results are stored in a database. FIG. 5 illustrates the procedure of a process for grouping pieces of face information regarded as indicating the same person based on detected face position information. FIG. 6 is the procedure of a process for determining a scenario for creating layouts based on analysis information regarding images and various pieces of information input by the user and automatically generating layouts based on the scenario.

In S301 illustrated in FIG. 3, pieces of image data are obtained. The pieces of image data are obtained when, for example, the user has connected an image capture device or a memory card in which captured images are stored to the information processing apparatus 115 and the information processing apparatus 115 has read the captured images from the connected image capture device or memory card. Alternatively, pieces of image data obtained by the internal image capture device 106 and saved in the secondary storage device 103 may be obtained. Alternatively, pieces of image data may be obtained from somewhere other than the information processing apparatus 115, such as the external server 114 connected to the Internet 113, through the wireless LAN 109.

Figure 8A:
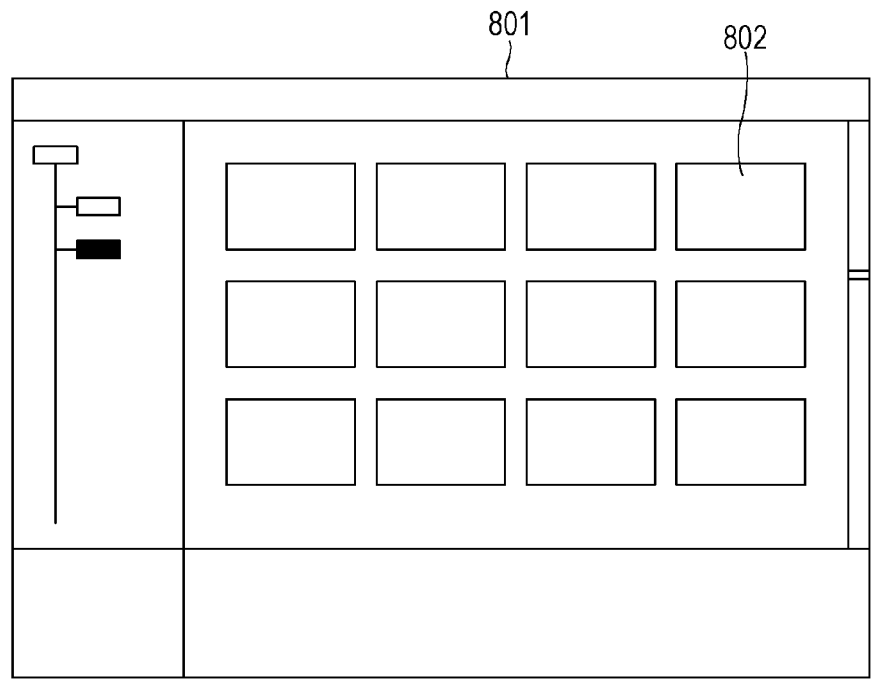
FIG. 8A is a diagram illustrating an example of displayed images in a thumbnail format according to the first embodiment.
Figure 8B:
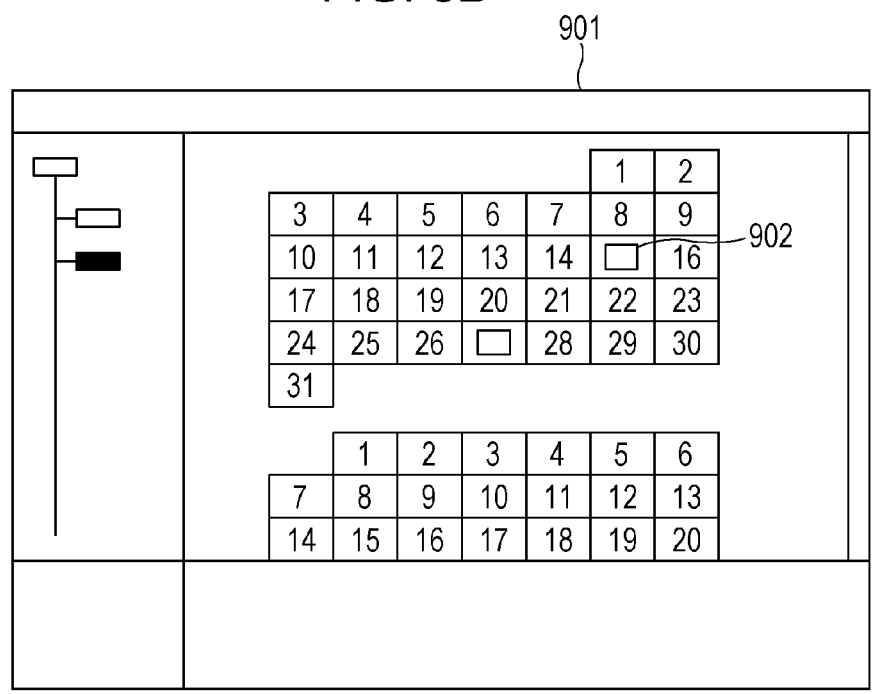
FIG. 8B is a diagram illustrating an example of displayed images in a calendar format according to the first embodiment.

When the pieces of image data have been obtained, thumbnails are displayed in a UI as illustrated in FIG. 8A or 8B. As indicated by a UI 801 illustrated in FIG. 8A, thumbnails 802 of images may be displayed in units of folders in the secondary storage device 103, or, as illustrated in FIG. 8B, image data may be managed in units of days in a UI 901 that looks like a calendar. In the case of FIG. 8B, images captured on a certain day are displayed as a list of thumbnails such as that illustrated in FIG. 8A by clicking a date area 902.

Next, in S302, each image is decoded. More specifically, an application searches for an image that has been newly saved and that has not been subjected to the sensing process, and the image codec unit 200 converts the extracted image from compressed data into bitmap data.

Next, in S303, the sensing process is executed on the bitmap data. The sensing process here includes various processes listed in Table 1 presented below. In this embodiment, the sensing process includes, for example, face detection, an analysis of the feature quantity of an image, and a scene analysis, which produce results having data types indicated in Table 1.

TABLE 1

Example of attribute information obtained as a result of image analyses

| Sensing major category | Sensing minor category | Data type | Value |
|---|---|---|---|
| Image basic feature quantity | Average luminance | int | 0 to 255 |
| | Average chroma | int | 0 to 255 |
| | Average hue | int | 0 to 359 |
| Face detection | Number of persons' faces | int | 0 to MAXFACE |
| | Coordinate position | int * 8 | 0 to Width or Height |
| | Average Y in face region | int | 0 to 255 |
| | Average Cb in face region | int | −128 to 127 |
| | Average Cr in face region | int | −128 to 127 |
| Scene analysis | Scene result | char | Landscape Nightscape Portrait Underexposure Others |

The sensing process will be described hereinafter.

Overall average luminance and average chroma, which are basic feature information regarding an image (for example, basic feature quantities of an image), can be obtained using known methods, and accordingly further detailed description thereof is omitted. The average luminance can be calculated by converting (conversion expression omitted), for each pixel in the image, RGB components into known luminance color difference components (for example, YCbCr components) and obtaining an average value of the Y component. In addition, the average chroma can be calculated by obtaining, for the CbCr components of each pixel, an average value of S using the following expression.

$$S = \sqrt{Cb^2 + Cr^2}$$ [Expression 1]

In addition, average hue (AveH) in the image is a feature quantity for evaluating the colors of the image. The hue in each pixel can be calculated using a known HIS conversion expression, and AveH can be calculated by averaging the hues in the entirety of the image.

In addition, as described above, these feature quantities may be calculated in the entirety of the image, or, for example, the image may be divided into regions having a certain size and the feature quantities may be calculated in each region.

Next, object detection will be described. In this embodiment, persons' faces are detected in the object detection. As a method for detecting persons' faces used in this embodiment, a known method may be used.

In a method disclosed in Japanese Patent Laid-Open No. 2002-183731, an eye region is detected in an input image, and an area around the eye region is determined as a candidate face region. A luminance gradient and a weighting in the luminance gradient in each pixel are calculated for the candidate face region, and obtained values are compared with a preset gradient and weighting in the gradient in an ideal reference face image. At this time, if each average angle between gradients is smaller than or equal to a certain threshold, it is determined that the input image includes a face region.

In addition, in a method disclosed in Japanese Patent Laid-Open No. 2003-30667, first, a flesh color region is detected in an image, and then human iris color pixels are detected in the flesh color region, in order to detect the positions of eyes.

In a method disclosed in Japanese Patent Laid-Open No. 8-63597, first, matching rates between a plurality of templates having the shapes of faces and an image are calculated. A template with which the matching rate is the highest is then selected, and if the highest matching rate is equal to or higher than a predetermined threshold, a region inside the selected template is determined as a candidate face region. The positions of eyes can be detected using this template.

Furthermore, in a method disclosed in Japanese Patent Laid-Open No. 2000-105829, first, the entirety of an image or a specified region in the image is scanned using a nose image pattern as a template, and a position that most closely matches the template is output as the position of a nose. Next, while assuming that a region located above the position of the nose in the image is a region in which eyes exist, the eye presence region is scanned using eye image patterns as templates to see if the eye presence region matches the templates. Thus, a candidate eye presence position group, which is a group of pixels with which the matching rates are higher than a certain threshold, is obtained. Next, a continuous region included in the candidate eye presence position group is divided into clusters, and distances between the clusters and the position of the nose are calculated. A cluster with which the distance is the shortest is determined as a cluster in which the eyes exist, thereby detecting the position of the organs.

Other methods for detecting persons' faces include methods for detecting the positions of faces and organs disclosed in Japanese Patent Laid-Open No. 8-77334, Japanese Patent Laid-Open No. 2001-216515, Japanese Patent Laid-Open No. 5-197793, Japanese Patent Laid-Open No. 11-53525, Japanese Patent Laid-Open No. 2000-132688, Japanese Patent Laid-Open No. 2000-235648, and Japanese Patent Laid-Open No. 11-250267. In addition, the process for detecting persons' faces may use a method disclosed in Japanese Patent No. 2541688, but the method used in the present invention is not particularly limited.

In this embodiment, a certain type of face detection is defined as FD1. As a result of processing of target images by the FD1, the number of persons' faces and the coordinate positions of the faces can be obtained in each input image.

In addition, when the coordinate positions of the faces in each image are known, the feature quantities of face regions can be analyzed. For example, by calculating average YCbCr values of pixel included in each region, average luminance and an average color difference in each face region can be obtained.

In addition, a process for analyzing a scene can be performed using the feature quantities of each image. The process for analyzing a scene can be performed using a method disclosed in, for example, Japanese Patent Laid-Open No. 2010-251999, Japanese Patent Laid-Open No. 2010-273144, or the like disclosed by the applicant. As a result of the process for analyzing a scene, an identifier (ID) for identifying an image capture scene as landscape, nightscape, portrait, underexposure, or another scene can be obtained.

It is to be noted that although sensing information is obtained by the sensing process in this embodiment, other types of sensing information may be used, instead.

The sensing information obtained in the above-described manner is saved in the database unit 202. With respect to a saving format of the database unit 202, for example, the sensing information may be described and stored using the following general format (for example, eXtensible Markup Language (XML)).

[Expression 2]
List.1

```
<?xml version="1.0" encoding="utf-8"?>
<IMAGEINFO>
    <BaseInfo>
        <ID>0x00000001</ID>
        <ImagePath>C:\My Picture\IMG0001.jpg</ImagePath>
        <ImageSize width=3000. height=2000 />
        <CaptureDateTime>20100101:120000<CaptureDateTime>
    </BaseInfo>
    <SensInfo>
        <AveY>122</AveY>
        <AveS>38</AveS>
        <AveH>50</AveH>
        <SceneType>Landscape</SceneType>
        <AppliedFDVersion>1</AppliedFDVersion>
        <Person>
            <ID>0</ID>
            <Reliability>80</Reliability>
            <FDVersion>1</FDVersion>
            <Position>
                <LeftTop x=420. y=200/>
                <LeftBottom x=420. y=300/>
                <RightTop x=520. y=200/>
                <RightBottom x=520. y=300/>
            </Position>
            <AveY>128</AveY>
            <AveCb>-20</AveCb>
            <AveCr>20</AveCr>
        </Person>
        ...
    </SensInfo>
    <UserInfo>
        <FavoriteRate>3</FavoriteRate>
        <ViewingTimes>5</ViewingTimes>
        <PrintingTimes>3</PrintingTimes>
        <Event>Travel</Event>
    </UserInfo>
    ...
</IMAGEINFO>
```

In List 1, an example is indicated in which attribute information regarding each image is described using three different categories.

A BaseInfo tag is a tag for storing information added to an image file in advance as an image size and image capture time information. The tag includes an ID of each image, a storage location in which each image file is stored, the image size, and image capture time.

A SensInfo tag is a tag for storing results of the image analysis process. The average luminance, the average chroma, the average hue, and a result of the scene analysis in the entirety of an image are stored, and information regarding the positions of persons' faces existing in the image and face colors is also stored.

In addition, an AppliedFDVersion tag is a tag for describing a version of face detection applied to a target image. Since a face detection technology used here is the FD1, a value of 1 is described as connected information.

In addition, at a next level, information regarding each of a plurality of detected face regions can be described in each Person tag. An ID tag is an identifier given to each detected face region. In addition, the version of face detection in which each region has been detected can be described in an FDVersion tag. Whereas the FDVersion tag indicates the version of face detection in which each face region has been detected, the AppliedFDVersion tag indicates the version of face detection applied to the entirety of the image. Here, too, the value of 1 connected with the face detection FD1 is described.

In addition, a face detection reliability value can be stored in a Reliability tag. The Reliability tag varies, for example, from 0 to 100, and the larger the value, the higher the probability that a detected face region correctly includes a face. Calculation of the face detection reliability value differs between the methods for detecting faces, but, for example, in a method in which template matching is used, a value obtained by normalizing the similarity between a face template and a face image or the like is used.

A third tag, namely a UserInfo tag, is a tag for storing information input by a user for each image. Details will be described later.

It is to be noted that the method for storing image attribute information in the database unit 202 is not limited to that described above. Any format may be used for storing the image attribute information.

In S305 illustrated in FIG. 3, whether an image subjected to the processing in S302 and S303 is a last image. If the image is the last image, the process proceeds to S306, and if the image is not the last image, the process returns to S302.

In S306, a process for generating a group of each person is performed using the face position information detected in 303. By automatically grouping faces of each person, the user can efficiently attach a name to each person.

The generation of person groups here is executed through the processing procedure illustrated in FIG. 5 using a method for recognizing persons.

It is to be noted that the process for recognizing persons is mainly executed by extracting the feature quantities of organs such as eyes and a mouth in each face and comparing the similarities of relationships between these organs. The process for recognizing persons is disclosed in, for example, Japanese Patent No. 3469031, and accordingly detailed description thereof is omitted here.

FIG. 5 is a basic flowchart illustrating the process for generating person groups S306.

First, in S501, an image saved in the secondary storage device 103 is read and subjected to a decoding process. Furthermore, in S502, the database unit 202 is accessed to obtain the number of faces included in the image and positional information regarding the faces. Next, in S504, normalized face images for performing the process for recognizing persons are generated.

Here, the normalized face images are face images obtained by extracting and converting faces of various sizes, directions, and resolutions included in the image such that all the faces have a certain size and direction. Because the positions of organs such as eyes and mouths are important in recognizing persons, the size of the normalized face images is desirably large enough to be able to certainly recognize the organs. By generating the normalized face images in this manner, faces of various resolutions need not be dealt with in the process for detecting feature quantities.

Next, in S505, face feature quantities are calculated from the normalized face images. The face feature quantities include the positions and the sizes of organs such as eyes, mouths, and noses and the contours of faces.

Furthermore, in S506, whether the face feature quantities are similar to those stored in a database (hereinafter referred to as a face dictionary) in which the face feature quantities are stored for each person's identifier (dictionary ID) is determined. The similarity is calculated, for example, by comparing the feature quantities managed using the dictionary IDs and the newly input feature quantities. The feature quantities used here are held information regarding the positions of organs such as eyes, noses, and mouths, distances between the organs, and the like. The similarity is high when the feature quantities are similar to each other and low when the feature quantities are not similar to each other, and, for example, varies from 0 to 100. The calculated similarity is compared with a threshold held in advance, and if the similarity is higher than the threshold, it is determined that a person is the same as one having a certain dictionary ID. On the other hand, if the similarity is lower than or equal to the threshold, it is determined that the person is not the same as the one having the certain dictionary ID. The same threshold for making a determination as to the similarity may be held for all the dictionary IDs, or a different threshold may be held for each dictionary ID.

If a result of the determination in S506 is YES, the process proceeds to S509, and the feature quantities of the face are added to the dictionary ID of the same person.

If a result of the determination in S506 is NO, the process proceeds to S508, and it is determined that the face that is being evaluated is not the face of one of persons registered to the face dictionary so far, and a new dictionary ID is issued and added to the face dictionary. The processing in S502 to S509 is applied to all the face regions detected in the input images in order to group detected persons.

Results of the process for generating person groups are described using a dictionary ID tag for each face and saved in the above-described database as indicated in the following XML format in List 2.

[Expression 3]
List.2

```
<?xml version="1.0" encoding="utf-8"?>
<PERSONINFO>
    <ID>0</ID>
    <Name>father</Name>
    <Birthday>19700101</Birthday>
    <Relationship>father</Relationship>
</PERSONINFO>
<PERSONINFO>
    <ID>1</ID>
    <Name>son</Name>
    <Birthday>20000101</Birthday>
    <Relationship>son</Relationship>
```

[Expression 3]
List.2

```
</PERSONINFO>
...
```

Here, the content of the face dictionary generated by the process for generating person groups is illustrated in FIG. 17A. FIG. 17A illustrates dictionary IDs 2201 and face feature quantities 2203. The face feature quantities managed using the same dictionary ID are face feature quantities of faces that have been determined as belonging to the same person in the process for recognizing persons.

It is to be noted that although, as illustrated in FIG. 3, the process for generating person groups is executed after the sensing process for all the images is completed in this embodiment, another method may be used, instead. For example, as illustrated in FIG. 4, the same results can be obtained even if an operation is repeated in which a grouping process S405 is performed using face detection position information after the sensing process is executed on an image in S403.

Figure 7:
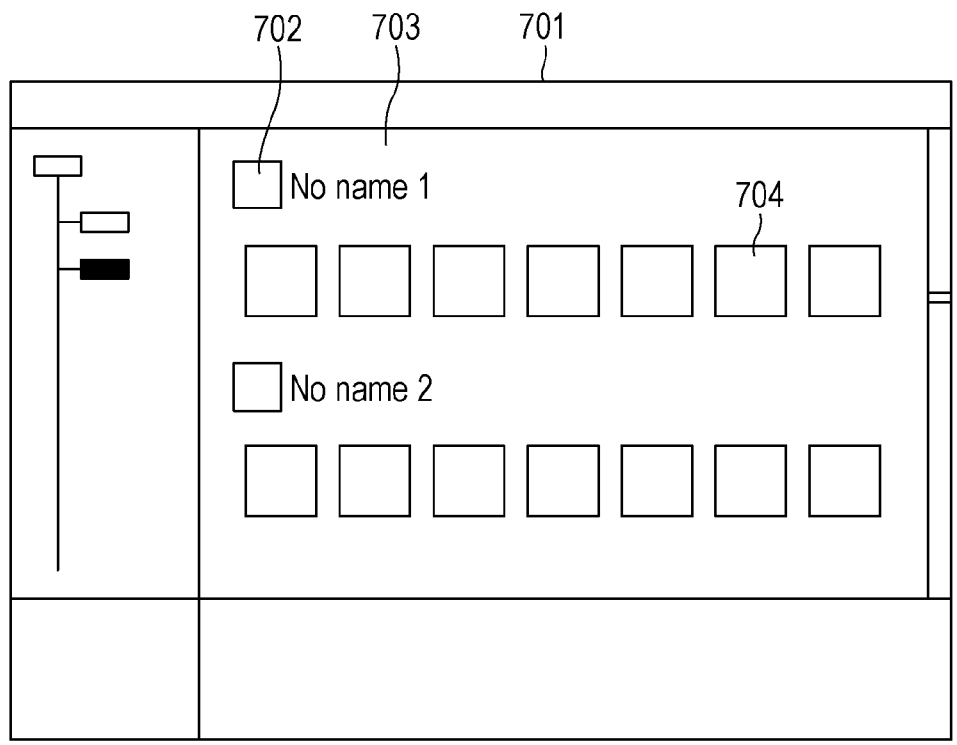
FIG. 7 is a diagram illustrating an example of displayed person groups according to the first embodiment.

In addition, each person group obtained by performing the process for generating person groups is displayed in a UI 701 illustrated in FIG. 7. FIG. 7 illustrates a representative face image 702 of each person group and a field 703 in which the name of each person group is indicated. Immediately after the completion of the process for automatically grouping persons, the names of the persons are indicated as "No name 1", "No name 2", and the like as illustrated in FIG. 7. These names of persons will be referred to as "person IDs" hereinafter. In addition, a plurality of face images 704 are included in each person group. In the UI 701 illustrated in FIG. 7, the name of a person and information such as the date of birth and a person's relation can be input by specifying each field 703 indicating "No name X", detail of which will be described later.

At this time, as indicated by person IDs 2202 illustrated in FIG. 17A, the dictionary IDs 2201 and the person IDs 2202 are connected (associated) with each other and managed.

In addition, the sensing process may be executed using a background task of an operating system (OS). In this case, the user can continue the sensing process for images even if he/she is performing another operation on the computer.

In this embodiment, the user can manually input various pieces of attribute information regarding images.

A list of examples of the attribute information (hereinafter referred to as manually registered information) is indicated in Table 2. The manually registered information is roughly classified into information set for each image and information set for each person for whom the grouping process has been performed.

TABLE 2

| Category | Content | Data type | Value |
|---|---|---|---|
| Image | Favor | int | 0 to 5 |
| | Event | char | "travel" "graduation" "wedding" |
| Person | Name | char | "NAME" |
| | Date of birth | char | YYYYMMDD |
| | Relation | char | "family""" |

Figure 9A:
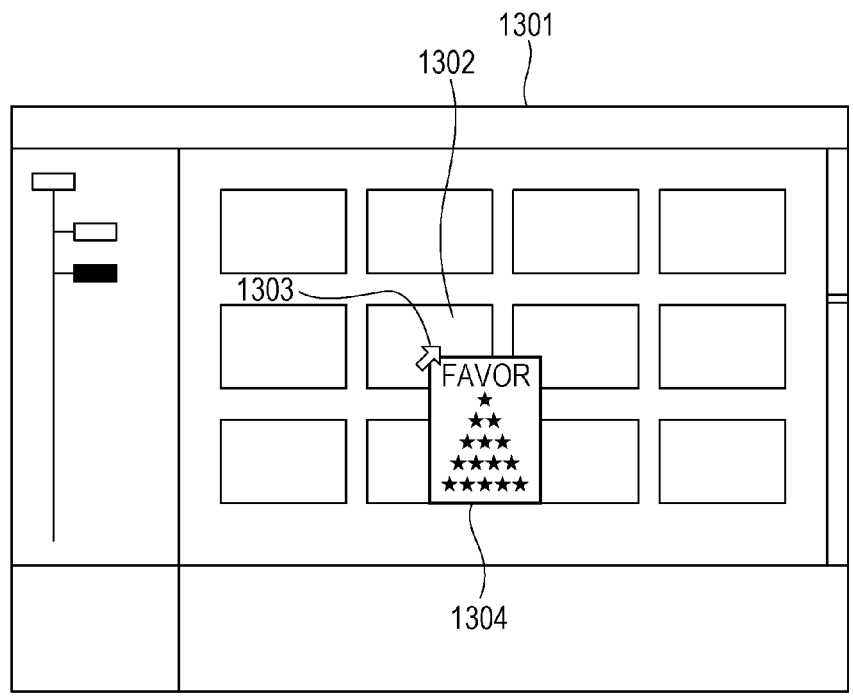
FIG. 9A is a diagram illustrating an example of a user interface (UI) for manually inputting a user's favor.

First, the attribute information set for each image includes the user's favor. For the user's favor, the user manually inputs how much he/she likes a certain image stepwise. For example, as illustrated in FIG. 9A, a dialog for enabling the user to input his/her favor is displayed by right-clicking on a desired thumbnail image 1302 in a UI 1301 using a mouse pointer 1303. In a menu, the user can select the number of stars in accordance with his/her favor. In this embodiment, a larger number of stars are set when he/she likes a certain image more.

In addition, the user's favor need not be manually set by the user but may be automatically set. For example, assume that the user clicks on a desired image file in the list of image thumbnails illustrated in FIG. 8A and a single-image display screen is displayed. The number of times that the desired image file has been displayed may then be counted and the user's favor may be set in accordance with the number of times of page views. For example, when the number of page views is large, it is determined that the user likes the image much.

Alternatively, in another example, the number of times of printing may be set as the user's favor. For example, when an operation for printing a certain image has been performed, it may be determined that the user likes the image much and the user's favor may be increased. In this case, the number of times of printing is counted, and the user's favor is set in accordance with the number of times of printing.

As described above, the user's favor may be manually set by the user, may be set in accordance with the number of page views, or may be set in accordance with the number of times of printing. The setting and the obtained information are individually stored in the UserInfo tag of the database unit 202 in the XML format indicated in List 1. For example, the user's favor is stored in a FavoriteRate tag, the number of page views is stored in a ViewingTimes tag, and the number of times of printing is stored in a PrintingTimes tag.

In addition, event information is another piece of the information set for each image. The event information may be, for example, a family trip "travel", a graduation ceremony "graduation", or a wedding ceremony "wedding".

Figure 9B:
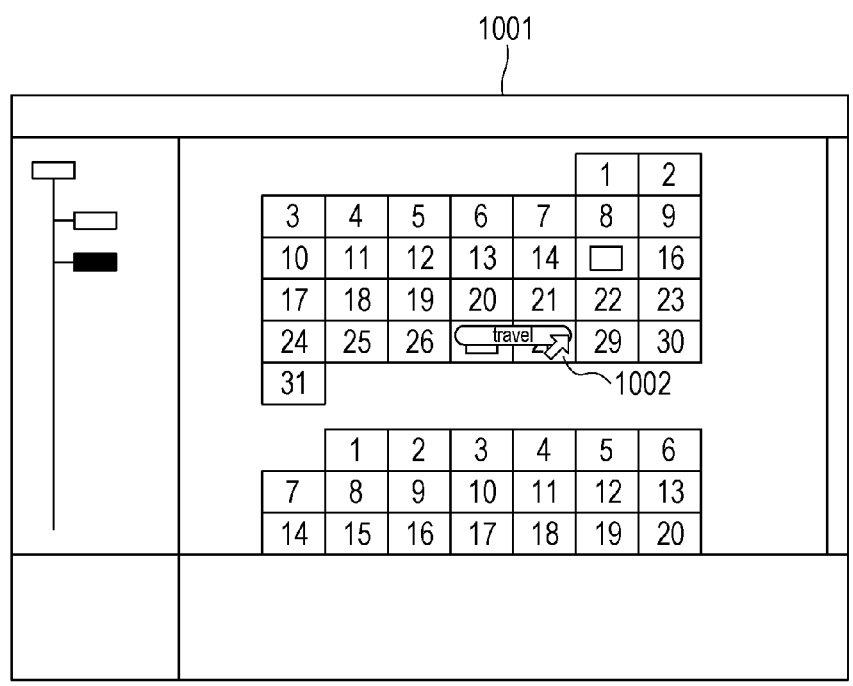
FIG. 9B is a diagram illustrating an example of a UI for manually inputting event information.

As illustrated in FIG. 9B, an event may be determined by clicking on a desired date on a calendar using a mouse pointer 1002 or the like and inputting the name of the event of that day. The determined name of the event is included in the XML format indicated in List 1 as part of the attribute information regarding an image. In the format indicated in List 1, the name of the event and the image are connected with each other using an Event tag in the UserInfo tag. It is to be noted that "connection" refers to "association" in the following description.

Next, attribute information regarding persons will be described.

Figure 10:
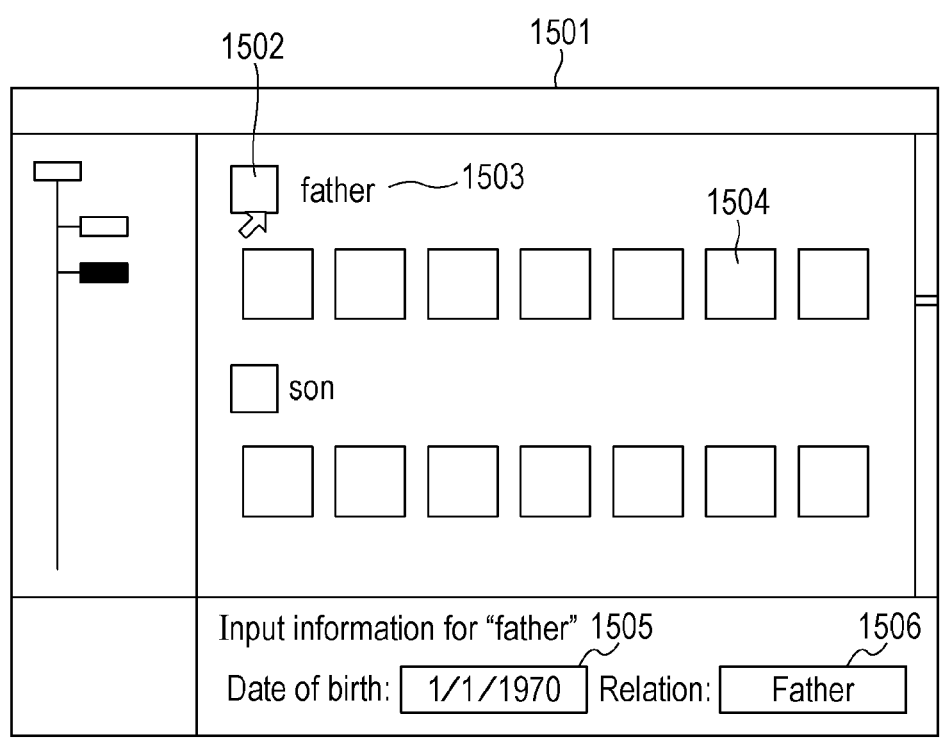
FIG. 10 is a diagram illustrating an example of a UI for manually inputting person attribute information.

FIG. 10 illustrates a UI for inputting the attribute information regarding persons. In FIG. 10, a representative face image 1502 indicates a certain person ("father" in this case). A display field 1503 displays the name (person ID) of the certain person. In addition, images (thumbnails) 1504 are images detected in other images and determined in S506 to have close face feature quantities. Thus, in FIG. 10, the list of images 1504 determined in S506 to have close face feature quantities is displayed under the person ID 1203.

As illustrated in FIG. 7, the name of each person group has not been input immediately after the completion of the sensing process, but by clicking on the field 703 indicating "No name", an arbitrary name of a person can be input.

In addition, as the attribute information regarding each person, the date of birth of each person and each person's relation to the user who is operating the applications can be set. By clicking on the representative face image 1502 of the person illustrated in FIG. 10, the date of birth of the selected person can be input in a first input field 1505 as indicated in a lower part of the screen. In addition, the selected person's relation can be input in a second input field 1506.

Unlike the attribute information associated with images, the input attribute information regarding persons is managed in the database unit 202 using the XML format indicated in List 2 separately from the attribute information regarding images.

On the other hand, as indicated by person IDs 2302 illustrated in FIG. 17B, input names may be connected with dictionary IDs and managed separately from the XML format.

In this embodiment, a process for generating layouts is performed using various layout templates prepared in advance. The layout templates may be ones illustrated in FIGS. 11A and 11B, and include a plurality of image arrangement frames 1702, 1902, and 1903 (synonymous with "slots" in the following description) in a layout sheet size.

A large number of templates may be prepared and saved in the secondary storage device 103 in advance when software for executing this embodiment has been installed on the information processing apparatus 115. In addition, as another method, arbitrary templates may be obtained from the external server 114 connected to the Internet 113 connected through the IF 107 or the wireless LAN 109.

Assume that these templates are described in a versatile structured language, that is, for example, XML, as in the above-described case of storage of the results of the sensing process. Examples of XML data are indicated in List 3 and List 4.

[Expression 4]
List.3

```
<?xml version="1.0" encoding="utf-8"?>
<LayoutInfo>
    <BASIC>
        <Theme></Theme>
        <PageSize>A4</PageSize>
        <Resolution>300</Resolution>
    </BASIC>
    <ImageSlot>
        <ID>0</ID>
        <POSITION>
                <LeftTop x=100. y=200/>
                <LeftBottom x=100. y=800/>
                <RightTop x=1000. y=200/>
                <RightBottom x=1000. y=800/>
        </POSITION>
        <Shape>Rectangle</Shape>
        <PersonGroup>MainGroup</PersonGroup>
    </ImageSlot>
    <ImageSlot>
        <ID>1</ID>
        <POSITION>
                <LeftTop x=800. y=700/>
                <LeftBottom x=800. y=1500/>
                <RightTop x=1700. y=700/>
                <RightBottom x=1700. y=1500/>
        </POSITION>
        <Shape>Rectangle</Shape>
        <PersonGroup>MainGroup</PersonGroup>
    </ImageSlot>
    <ImageSlot>
        <ID>2</ID>
        <POSITION>
                <LeftTop x=300. y=1700/>
                <LeftBottom x=300. y=2300/>
                <RightTop x=1200. y=1700/>
                <RightBottom x=1200. y=2300/>
        </POSITION>
```

-continued

[Expression 4]
List.3

```
        <Shape>Rectangle</Shape>
        <PersonGroup>MainGroup</PersonGroup>
    </ImageSlot>
</LayoutInfo>
```

[Expression 5]
List.4

```
<?xml version="1.0" encoding="utf-8"?>
<LayoutInfo>
    <BASIC>
        <Theme></Theme>
        <PageSize>A4</PageSize>
        <Resolution>300</Resolution>
    </BASIC>
    <ImageSlot>
        <ID>0</ID>
        <POSITION>
            <LeftTop x=400. y=900/>
            <LeftBottom x=400. y=1500/>
            <RightTop x=1300. y=900/>
            <RightBottom x=1300. y=1500/>
        </POSITION>
        <Shape>Rectangle</Shape>
        <PersonGroup>SubGroup</PersonGroup>
    </ImageSlot>
    <ImageSlot>
        <ID>1</ID>
        <POSITION>
            <LeftTop x=700. y=100/>
            <LeftBottom x=700. y=500/>
            <RightTop x=1100. y=100/>
            <RightBottom x=1100. y=500/>
        </POSITION>
        <Shape>ellipse</Shape>
        <PersonGroup>MainGroup</PersonGroup>
    </ImageSlot>
    <ImageSlot>
        <ID>2</ID>
        <POSITION>
            <LeftTop x=1100. y=200/>
            <LeftBottom x=1100. y=600/>
            <RightTop x=1450. y=200/>
            <RightBottom x=1450. y=600/>
        </POSITION>
        <Shape>ellipse</Shape>
        <PersonGroup>MainGroup</PersonGroup>
    </ImageSlot>
    ......
</LayoutInfo>
```

In these examples, first, basic information regarding a layout page is described in a BASIC tag. The basic information may be, for example, the theme and the page size of the layout, the resolution (dpi) of a page, and the like. In each of these examples, a Theme tag, which indicates the theme of the layout, is left blank in an initial state of the template. In addition, as the basic information, the page size is set to A4, and the resolution is set to 300 dpi.

Figure 11A:
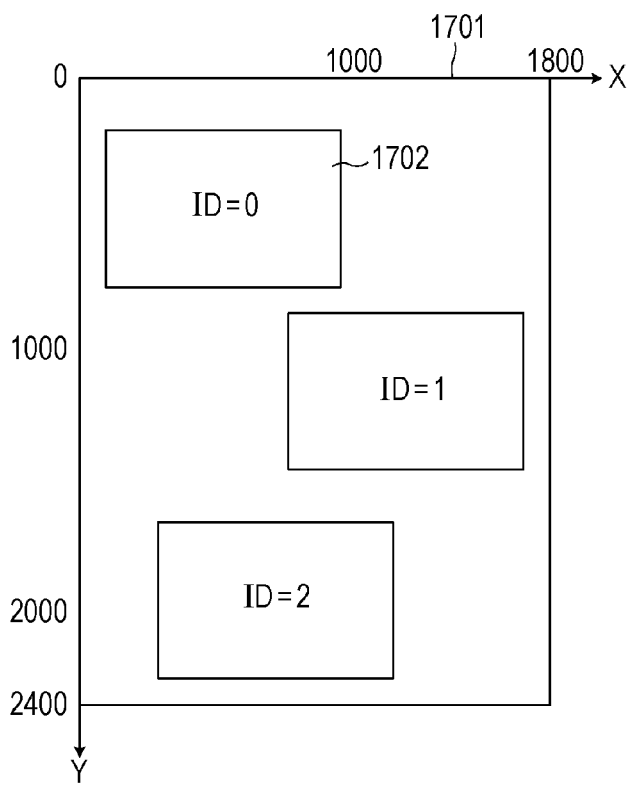
FIGS. 11A and 11B are diagrams illustrating examples of a layout template.

In addition, ImageSlot tags describe information regarding the above-described image arrangement frames. An ID tag and a POSITION tag, which describe the ID and the position of each image arrangement frame, respectively, are held in each ImageSlot tag. Positional information is defined, as illustrated in FIGS. 11A and 11B, in an XY coordinate system with an origin at an upper-left corner.

In addition, each ImageSlot tag sets, for each slot, the shape of the slot and the name of a recommended person group to be arranged. For example, in the template illustrated in FIG. 11A, all the slots have rectangular "rectangle" shapes as indicated by Shape tags in List 3, and Person-Group tags recommend that "MainGroup" be arranged as the names of person groups.

Figure 11B:
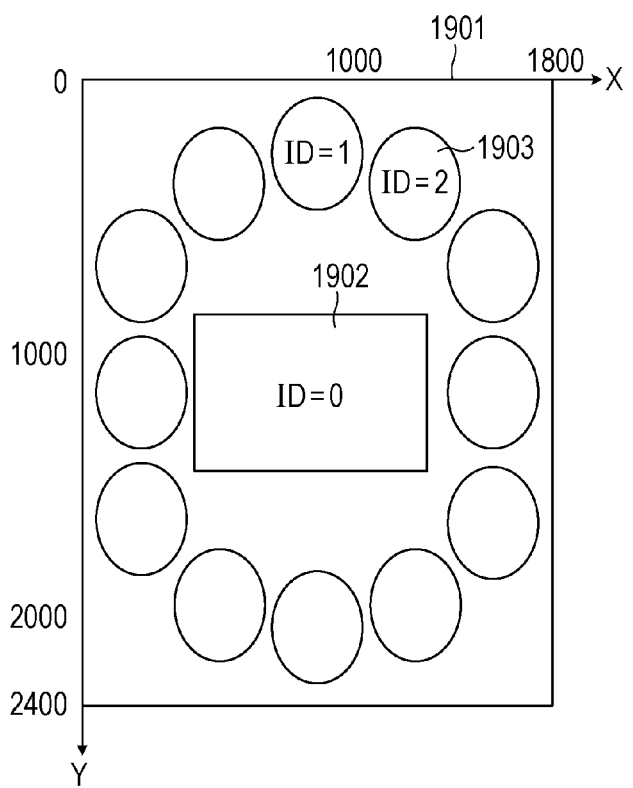

In addition, in the template illustrated in FIG. 11B, as indicated by List 4, a slot that is arranged at the center and whose ID is 0 has a rectangular shape, and it is recommended that "SubGroup" be arranged as the name of a person group. In addition, slots whose IDs are 1 and 2, respectively, have elliptical "ellipse" shapes, and it is recommended that "MainGroup" be arranged as the names of person groups.

In this embodiment, a large number of templates, such as those described above, are held.

The applications according to this embodiment are capable of automatically grouping persons and displaying the persons in a UI by executing the analysis process on input images. In addition, the user can input attribute information such as a name and the date of birth for each person group and set his/her favor for each image after viewing results of the analysis process. Furthermore, a large number of layout templates classified in accordance with themes can be held.

The applications according to this embodiment that satisfy the above conditions perform, at a certain timing, a process for automatically generating collage layouts that the user possibly likes and suggesting the collage layouts to the user (hereinafter referred to as a process for suggesting layouts).

FIG. 6 is a basic flowchart illustrating the process for suggesting layouts.

First, in S601, a scenario of the process for suggesting layouts is determined. The scenario includes determination of the themes and the templates of the layouts to be suggested, setting of a person (protagonist) focused in the layouts, and selection information regarding images used for generating the layouts.

A method for determining a scenario will be described hereinafter while taking two scenarios as examples.

For example, assume that configuration was performed two weeks ago for performing a process for automatically suggesting layouts of the date of birth of each person and a first birthday of a person "son" automatically grouped in FIG. 10 is approaching. In this case, the theme of the layouts to be suggested is determined as a growth record "growth". Next, a template is selected. In this case, a template such as one illustrated in FIG. 11B that is suitable for a growth record is selected, and, as indicated in List 5 presented below, "growth" is described in the Theme tag of XML. Next, as the protagonist "MainGroup" to be focused in the layouts, "son" is set. In addition, as "SubGroup", which is also focused in the layout, "son" and "father" are set. Next, images used for generating the layouts are selected. In this example, the database is referred to and a large number of images including "son" are extracted from images captured since the date of birth of the person "son" and listed. Thus, the determination of a scenario for growth record layouts is made.

[Expression 6]
List.5

```
<?xml version="1.0" encoding="utf-8"?>
<LayoutInfo>
    <BASIC>
        <Theme>growth</Theme>
```

-continued

[Expression 6]
List.5

```
        <PageSize>A4</PageSize>
        <Resolution>300</Resolution>
        <MainGroup>son</MainGroup>
        <SubGroup>son.father</SubGroup>
    </BASIC>
    <ImageSlot>
        <ID>0</ID>
        <POSITION>
                <LeftTop x=400. y=900/>
                <LeftBottom x=400. y=1500/>
                <RightTop x=1300. y=900/>
                <RightBottom x=1300. y=1500/>
        </POSITION>
        <Shape>Rectangle</Shape>
        <PersonGroup>SubGroup</PersonGroup>
    </ImageSlot>
    <ImageSlot>
        <ID>1</ID>
        <POSITION>
                <LeftTop x=700. y=100/>
                <LeftBottom x=700. y=500/>
                <RightTop x=1100. y=100/>
                <RightBottom x=1100. y=500/>
        </POSITION>
        <Shape>ellipse</Shape>
        <PersonGroup>MainGroup</PersonGroup>
    </ImageSlot>
    <ImageSlot>
        <ID>2</ID>
        <POSITION>
                <LeftTop x=1100. y=200/>
                <LeftBottom x=1100. y=600/>
                <RightTop x=1450. y=200/>
                <RightBottom x=1450. y=600/>
        </POSITION>
        <Shape>ellipse</Shape>
        <PersonGroup>MainGroup</PersonGroup>
    </ImageSlot>
    ......
</LayoutInfo>
```

As another example, assume that the process for suggesting layouts is executed if certain event information is registered in the past one month. If it is found out based on event information registered in FIG. 9B that, for example, there was a family trip a few days ago and a large number of images are saved in the secondary storage device 103, the scenario generation unit 204 generates a scenario for suggesting layouts for a family trip. In this case, the theme of the layouts to be suggested is determined as a travel "travel". Next, a template is selected. In this case, layouts such as one illustrated in FIG. 11A is selected, and, as indicated in the following List 6, "travel" is described in the Theme tag of XML. Next, "son", "mother" and "father" are set as the protagonists "MainGroup" to be focused in the layouts. Thus, by utilizing the characteristics of XML, a plurality of persons can be set as "MainGroup". Next, images for generating the layouts are selected. In this example, the database is referred to and a large number of images connected with the travel event are extracted and listed. Thus, the determination of a scenario of family trip layouts is made.

[Expression 7]
List.6

```
<?xml version="1.0" encoding="utf-8"?>
<LayoutInfo>
    <BASIC>
```

-continued

[Expression 7]
List.6

```
        <Theme>travel</Theme>
        <PageSize>A4</PageSize>
        <Resolution>300</Resolution>
        <MainGroup>son.mother.father</MainGroup>
    </BASIC>
    <ImageSlot>
        <ID>0</ID>
        <POSITION>
                <LeftTop x=100. y=200/>
                <LeftBottom x=100. y=800/>
                <RightTop x=1000. y=200/>
                <RightBottom x=1000. y=800/>
        </POSITION>
        <Shape>Rectangle</Shape>
        <PersonGroup>MainGroup</PersonGroup>
    </ImageSlot>
    <ImageSlot>
        <ID>1</ID>
        <POSITION>
                <LeftTop x=800. y=700/>
                <LeftBottom x=800. y=1500/>
                <RightTop x=1700. y=700/>
                <RightBottom x=1700. y=1500/>
        </POSITION>
        <Shape>Rectangle</Shape>
        <PersonGroup>MainGroup</PersonGroup>
    </ImageSlot>
    <ImageSlot>
        <ID>2</ID>
        <POSITION>
                <LeftTop x=300. y=1700/>
                <LeftBottom x=300. y=2300/>
                <RightTop x=1200. y=1700/>
                <RightBottom x=1200. y=2300/>
        </POSITION>
        <Shape>Rectangle</Shape>
        <PersonGroup>MainGroup</PersonGroup>
    </ImageSlot>
</LayoutInfo>
```

Figure 12:
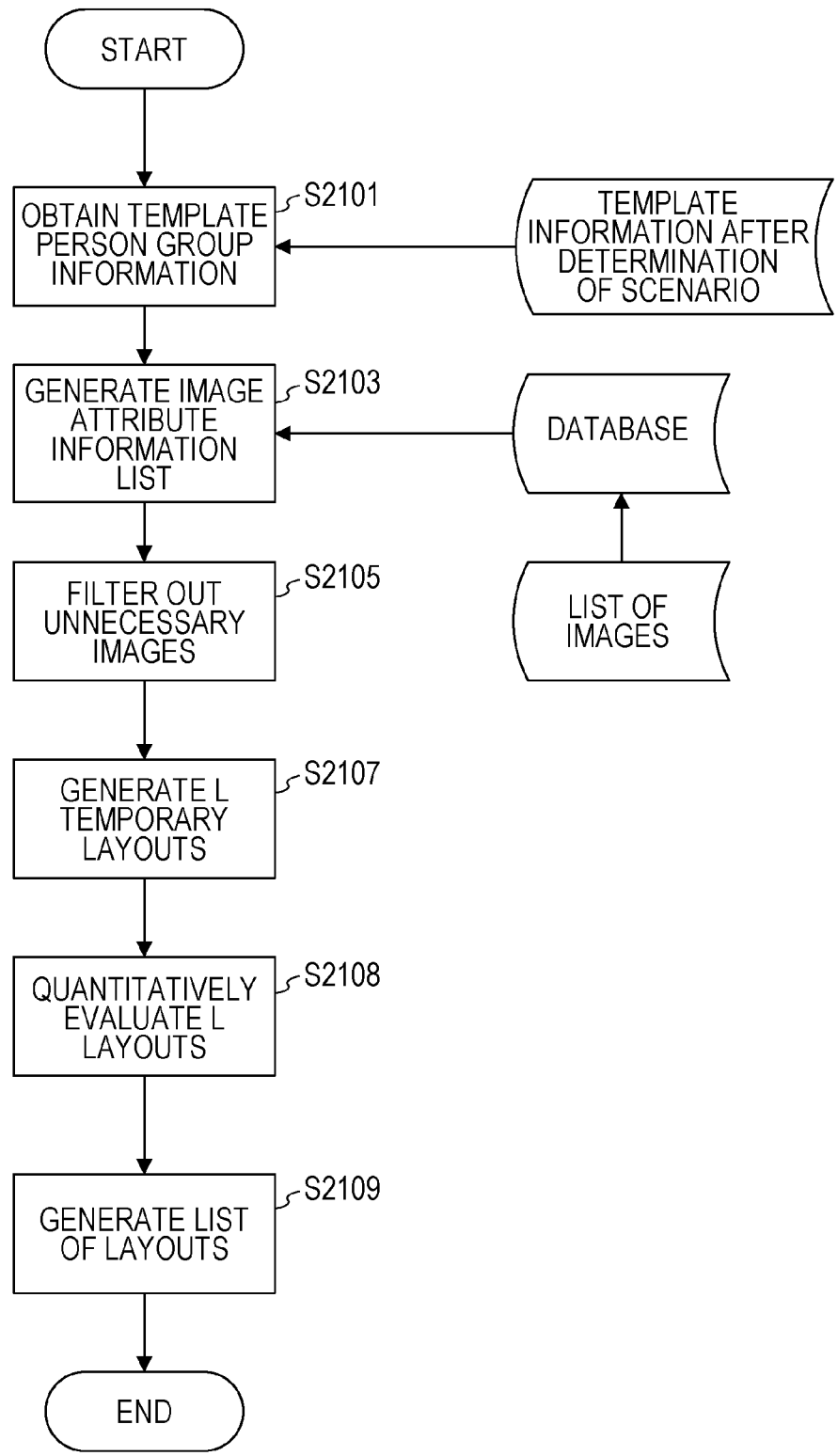
FIG. 12 is a flowchart illustrating a process for automatically generating layouts according to the first embodiment.

Next, in S603 illustrated in FIG. 6, a process for automatically generating layouts based on the above-described scenario is executed. FIG. 12 illustrates a detailed processing procedure performed by the layout generation unit 205. Each processing step will be described hereinafter with reference to FIG. 12.

First, in S2101, template information that has been determined in the above-described process for generating a scenario and for which the theme and person group information have been set is obtained.

Next, in S2103, the feature quantities of each image are obtained from the database based on the list of images determined in the scenario, in order to generate an image attribute information list. In the image attribute information list, IMAGEINFO tags, each of which is typically that indicated in List 1, for the number of images included in the list are arranged.

Thus, in the process for automatically generating layouts according to this embodiment, image data is not directly dealt with but attribute information saved in the database as a result of the sensing process for each image is used. If image data is directly dealt with in the process for generating layouts, an extremely large amount of memory is required to store the images, which is undesirable. That is, in this process, the amount of memory required in the process for generating a layout can be reduced.

Figure 13:
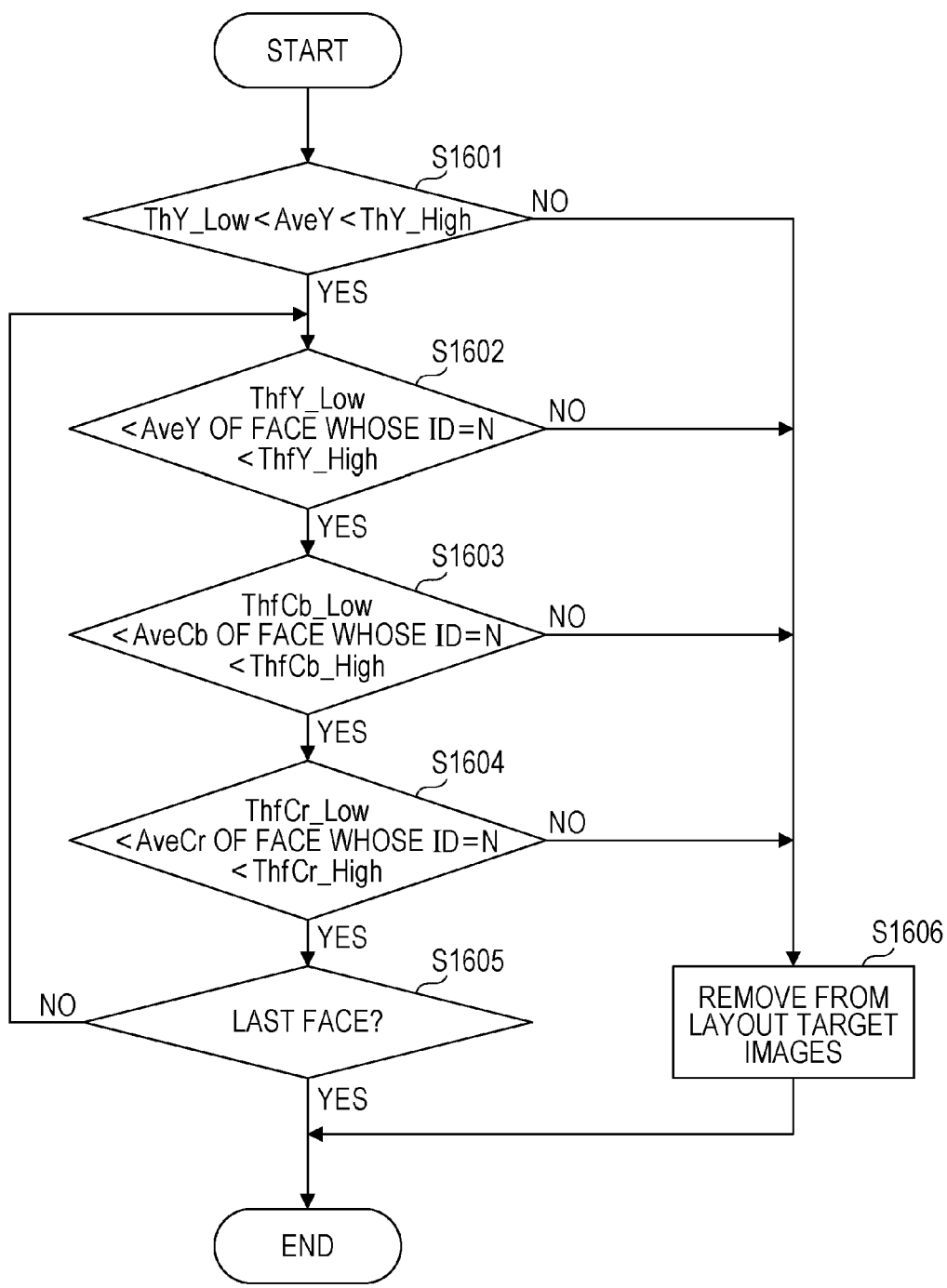
FIG. 13 is a flowchart illustrating a process for filtering out unnecessary images according to the first embodiment.

More specifically, first, in S2105, the input images are filtered using the attribute information regarding the input images to remove unnecessary images. The filtering process is performed using a procedure illustrated in FIG. 13. In FIG. 13, first, in S1601, whether overall average luminance falls between certain thresholds (ThY_Low and ThY_High) is determined for each image. If a result of the determination is negative, the process proceeds to S1606, and a target image is removed from layout targets.

Similarly, in S1602 to S1605, whether average luminance and an average color difference component fall between certain thresholds, which indicate a desirable flesh color region, is determined for each face region included in each target image. Images for which results of all the determinations made in S1602 to S1605 are YES are used in the subsequent process for generating layouts. More specifically, in S1602, whether AveY of a face region whose ID=N falls between certain thresholds (ThfY_Low and ThfY_High) is determined. In S1603, whether AveCb of the face region whose ID=N falls between certain thresholds (ThfCb_Low and ThfCb_High) is determined. In S1604, whether AveCr of the face region whose ID=N falls between certain thresholds (ThfCr_Low and ThfCr_High) is determined. In S1605, whether a target face is a last face is determined. If the target face is not the last face, the process returns to S1602, and if the target face is the last face, the process ends.

It is to be noted that because the filtering process aims to remove images that can be determined as obviously unnecessary for a subsequent process for generating temporary layouts, the above thresholds are desirably set loosely. For example, if a difference between ThY_High and ThY_Low is extremely small relative to the dynamic range of an image in the determination as to the overall luminance of an image in S1601, the number of images from which positive results are obtained becomes small. In order to avoid this, the thresholds are set in this embodiment in such a way as to increase the difference therebetween as much as possible but still be able to remove obviously abnormal images.

Next, in S2107 illustrated in FIG. 12, a large number of (L) temporary layouts are generated using the images determined in the above process as the layout targets. The temporary layouts are generated by repeating a process for arbitrarily assigning the input images to image arrangement frames of the obtained template. At this time, for example, some parameters (image selection, arrangement, and trimming) are randomly determined.

Figure 14:
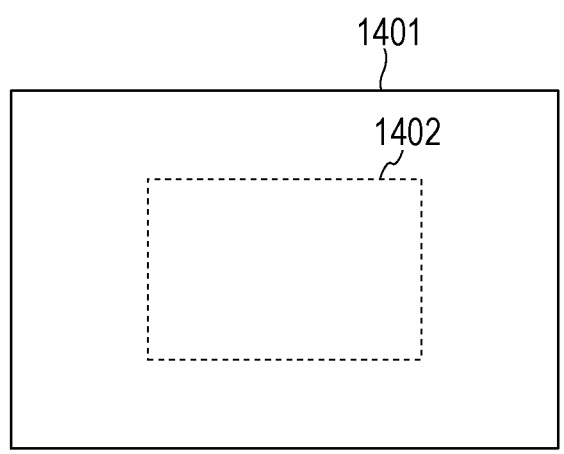
FIG. 14 is a diagram illustrating an example of an automatic trimming process according to the first embodiment.

An image selection criterion may be, for example, which of the images are to be selected when the number of image arrangement frames in the template is N. An arrangement criterion may be, for example, which if the arrangement frames the plurality of selected images are to be arranged in. A trimming criterion may be a trimming ratio indicating what percentage of the plurality of images arranged in the arrangement frames is to be trimmed. For example, the trimming ratio varies from 0 to 100%, and, as illustrated in FIG. 14, the trimming is performed at a certain trimming ratio with the center of an image set as a reference point. In FIG. 14, a trimming frame 1402 trims an image 1401 at a trimming ratio of 50%.

Based on the above-described image selection, arrangement, and trimming criteria, temporary layouts are generated as much as possible. Each of the generated temporary layouts can be expressed by XML as indicated in the following List 7. For each slot, the ID of an image that has been selected and arranged is described in an ImageID tag, and the trimming ratio is described in a TrimmingRatio tag.

[Expression 8]
List.7

```xml
<?xml version="1.0" encoding="utf-8"?>
<LayoutInfo>
    <BASIC>
        <Theme>growth</Theme>
        <PageSize>A4</PageSize>
        <Resolution>300</Resolution>
        <MainGroup>son</MainGroup>
        <SubGroup>son. father</SubGroup>
    </BASIC>
    <ImageSlot>
        <ID>0</ID>
        <POSITION>
            <LeftTop x=400. y=900/>
            <LeftBottom x=400. y=1500/>
            <RightTop x=1300. y=900/>
            <RightBottom x=1300. y=1500/>
        </POSITION>
        <Shape>Rectangle</Shape>
        <PersonGroup>SubGroup</PersonGroup>
        <ImageID>0x00000001</ImageID>
        <TrimingRatio>50.0</TrimingRatio>
    </ImageSlot>
    <ImageSlot>
        <ID>1</ID>
        <POSITION>
            <LeftTop x=700. y=100/>
            <LeftBottom x=700. y=500/>
            <RightTop x=1100. y=100/>
            <RightBottom x=1100. y=500/>
        </POSITION>
        <Shape>ellipse</Shape>
        <PersonGroup>MainGroup</PersonGroup>
        <ImageID>0x00000089</ImageID>
        <TrimingRatio>38.0</TrimingRatio>
    </ImageSlot>
    <ImageSlot>
        <ID>2</ID>
        <POSITION>
            <LeftTop x=1100. y=200/>
            <LeftBottom x=1100. y=600/>
            <RightTop x=1450. y=200/>
            <RightBottom x=1450. y=600/>
        </POSITION>
        <Shape>ellipse</Shape>
        <PersonGroup>MainGroup</PersonGroup>
        <ImageID>0x00000129</ImageID>
        <TrimingRatio>53.0</TrimingRatio>
    </ImageSlot>
    ......
</LayoutInfo>
```

It is to be noted that the number L of temporary layouts generated here is determined in accordance with the amount of processing of an evaluation process in a layout evaluation step, which will be described later, and the performance of the information processing apparatus 115 that performs the processing. In this embodiment, for example, hundreds of thousands of temporary layouts are generated. The generated layouts may be provided with IDs and saved in the secondary storage device 103 as a file using an XML format, or may be stored in the RAM 102 using another data structure such as a structure.

Next, in S2108 illustrated in FIG. 12, the large number of generated temporary layouts are quantitatively evaluated. More specifically, the L generated temporary layouts are evaluated using certain layout evaluation values. A list of layout evaluation values in this embodiment is indicated in Table 3. As indicated in Table 3, the layout evaluation values used in this embodiment can be roughly divided into three categories.

TABLE 3

| Category | Content | Score range | Theme importance value (weighting W) growth | Theme importance value (weighting W) travel | ... |
|---|---|---|---|---|---|
| Image individual evaluation | Brightness properness | 0 to 100 | 0.5 | 1.0 | |
| | Chroma properness | 0 to 100 | 0.5 | 1.0 | |
| Image/slot matching rate evaluation | Person matching rate | 0 to 100 | 1.0 | 0.5 | |
| | Trimming missing portion determination | 0 to 100 | 1.0 | 0.5 | |
| Page balance evaluation | Image similarity | 0 to 100 | 0.5 | 1.0 | |
| | Color variance | 0 to 100 | 0.5 | 1.0 | |
| | Face size variance | 0 to 100 | 0.5 | 1.0 | |
| Others | User's taste | 0 to 100 | 0.8 | 0.8 | |

Figure 15A:
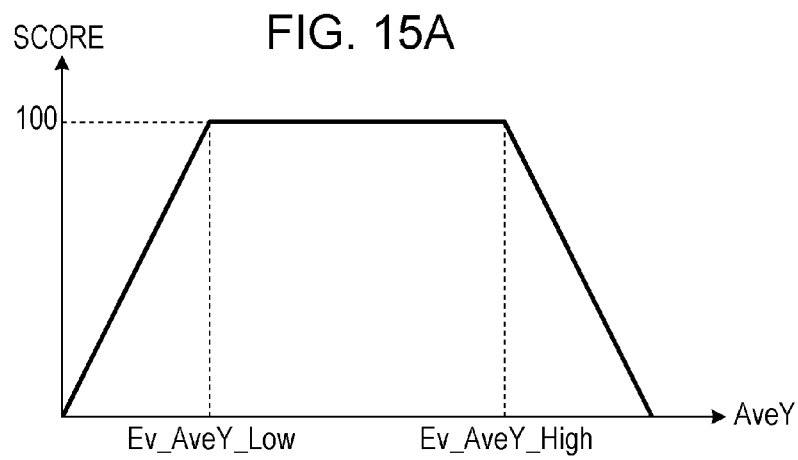
FIG. 15A is a diagram illustrating a method for calculating proper brightness according to the first embodiment.
Figure 15B:
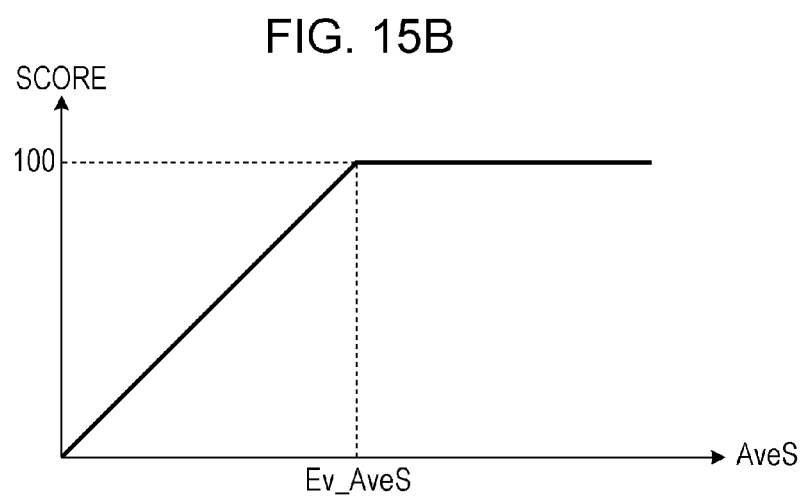
FIG. 15B is a diagram illustrating a method for calculating proper chroma according to the first embodiment.

One of the categories includes evaluation values for each image. These evaluation values determine the brightness, the chroma, and the blurriness of each image and the like to express these parameters in numbers. An example of the quantitation in this embodiment will be described hereinafter. With respect to brightness properness, as illustrated in FIG. 15A, a score of 100 is given when the average luminance falls within a certain range, and the score decreases when the average luminance falls out of the range. With respect to chroma properness, as illustrated in FIG. 15B, a score of 100 is given when the average chroma of the entirety of an image is larger than a certain chroma value, and the score gradually decreases when the average chroma is smaller than the certain value.

Figure 15C:
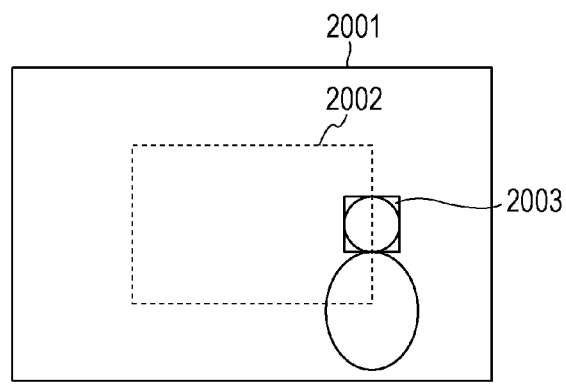
FIG. 15C is a diagram illustrating a process for determining a missing portion caused by trimming according to the first embodiment.

Another category is evaluation of a matching rate between an image and a slot. As the evaluation of the matching rate between an image and a slot, for example, a person matching rate and a determination of a missing portion caused by trimming are used. The person matching rate indicates a matching rate between a person specified in a slot and an actual person included in an image arranged in the slot. For example, assume that "father" and "son" are specified in PersonGroup specified in XML for a certain slot. At this time, if these two persons are included in the image assigned to the slot, a score of 100 is given as the person matching rate of the slot. If only one of the two persons is included, a score of 50 is given as the matching rate, and if neither of the two persons is included, a score of 0 is given. The matching rate in a page is an average value of the matching rates calculated for all slots. In the determination of a mission portion from the trimming frame 1402, for example, as illustrated in FIG. 15C, when a position 2003 of a face included in an image is known, a score of 0 to 100 is calculated in accordance with the area of a missing portion. If the area of a missing portion is 0, a score of 100 is given, and if the entirety of a face region is missing, a score of 0 is given.

The other category is evaluation of balance in a layout page. Evaluation values for evaluating balance include, for example, image similarity, color variance, and face size variance. The image similarity is similarity between images in a layout page calculated for each of the large number of generated temporary layouts. For example, when a layout having a theme of travel is to be created, the layout might not be desirable if only very similar images are arranged. Therefore, for example, the similarity can be evaluated based on the times of image capture. Images that were captured at times close to each other are likely to have been captured in similar places, but if the times of image capture are far from each other, it is likely that places and scenes are different. As indicated in List 1, the times of image capture can be obtained from the attribute information regarding the images saved in the database unit 202 in advance as image attribute information. In order to calculate the similarity based on the times of image capture, the following calculation is performed. For example, assume that four images indicated in Table 4 are included in a target temporary layout.

TABLE 4

| Image ID | Image capture time (YYYYMMDD:HHMMSS) |
|---|---|
| 25 | 20100101:120000 |
| 86 | 20100101:150000 |
| 102 | 20100101:170000 |
| 108 | 20100101:173000 |

In this case, a time difference between an image ID 102 and an image ID 108, namely 30 minutes, is the smallest difference. This difference is determined as MinInterval, and stored in units of seconds. That is, 30 minutes=1,800 seconds. MinInterval is calculated for each of the L temporary layouts and stored in an array stMinInterval[l]. Next, a maximum value MaxMinInterval is obtained from stMinInterval[l]. Here, a similarity evaluation value Similarity[l] of an l-th temporary layout can be calculated in the following manner.

$$Similarity[l]=100\times stMinInterval[l]/MaxMinInterval$$

That is, Similarity[l] becomes closer to 100 as the minimum image capture time difference gets larger, and becomes closer to 0 as the minimum image capture time difference gets smaller. Therefore, Similarity[l] is effective as the image similarity evaluation value.

Next, the color variance will be described. For example, when a layout having a theme of travel is to be created, the layout might not be desirable if only very similar colors (for example, blues of the sky and greens of mountains) are arranged. In this case, a layout that widely varies in color is highly evaluated. The variance of the average hue AveH of images included in the target l-th temporary layout is calculated, and the variance is stored as a color variance tmpColorVariance[l]. Next, a maximum value MaxColorVariance in tmpColorVariance[l] is obtained. Now, an evaluation value ColorVariance[l] of the color variance of the l-th temporary layout can be calculated in the following manner.

$$ColorVariance[l]=100\times tmpColorVariance[l]/MaxColorVariance$$

ColorVariance[l] becomes closer to 100 as the variance of the average hue of the images arranged in a page gets larger, and becomes closer to 0 as the variance gets smaller. Therefore, ColorVariance[l] can be used as the evaluation value of the color variance.

Next, the face size variance will be described. For example, when a layout having a theme of travel is to be created, the layout might not be desirable if, as a result of the layout, only images including faces of very similar sizes are arranged. A desirable layout is supposed to be a page in which the sizes of faces widely vary and the faces of various sizes are arranged in a well-balanced manner. In this case, a layout that widely varies in the size of faces is highly evaluated. The variance of the sizes (the length of a diagonal from the upper left to the lower right of the position of each face) of faces arranged in the target l-th temporary layout is stored as tmpFaceVariance[l]. Next, a maximum value MaxFaceVariance in tmpFaceVariance[l] is obtained. That is, an evaluation value FaceVariance[l] of the face size variance of the l-th temporary layout can be calculated in the following manner.

$$FaceVariance[l]=100\times tmpFaceVariance[l]/MaxFaceVariance$$

FaceVariance[l] becomes closer to 100 as the variance of the sizes of the faces arranged in a page gets larger, and becomes closer to 0 as the variance gets smaller. Therefore, FaceVariance[l] can be used as the evaluation value of the variation of the sizes of faces.

In addition, as yet another category, evaluation of the user's taste may be used.

The above-described plurality of evaluation values calculated for each temporary layout are integrated and used as a layout evaluation value for each temporary layout. The integrated evaluation value of the l-th temporary layout is denoted by EvalLayout[l], and the N evaluation values (include the evaluation values indicated in Table 3) calculated above are denoted by EvalValue[n]. At this time, the integrated evaluation value can be calculated in the following manner.

$$EvalLayout[l] = \sum_{n=0}^{N} EvalValue[n] \times W[n] \quad \text{[Expression 9]}$$

In the above expression, W[n] denotes a weighting of the evaluation values for each scene indicated in Table 3. A different weighting is set for a different theme. For example, compare the themes of the growth record "growth" and the travel "travel" indicated in Table 3. In the case of the theme of travel, it is often desirable to lay out a lot of high-quality photographs from various scenes. Therefore, configuration is performed in such a way as to give priority to the individual evaluation values of images and the balance evaluation value. On the other hand, in the case of the growth record "growth", whether a protagonist, who is the subject of the growth record, is certainly included in slots is often more important than variation of images. Therefore, configuration is performed in such a way as to give priority to the evaluation of the matching rates between images and slots over balance in a page or the individual evaluation of the images. It is to be noted that importance values of each theme in this embodiment are set as indicated in Table 3.

In S2109, a layout list LayoutList[k] for displaying results of the layout is generated using EvalLayout[l] calculated in the above manner. In the layout list, a predetermined number of (for example, five) identifiers 1 are stored in descending order of the evaluation value EvalLayout[l]. For example, if a temporary layout that has been given a highest score is an l=fiftieth temporary layout, LayoutList[0]=50. Similarly, the identifiers 1 of temporary layouts that have been given a second highest score and subsequent scores are stored in LayoutList[1] and later.

Figure 16:
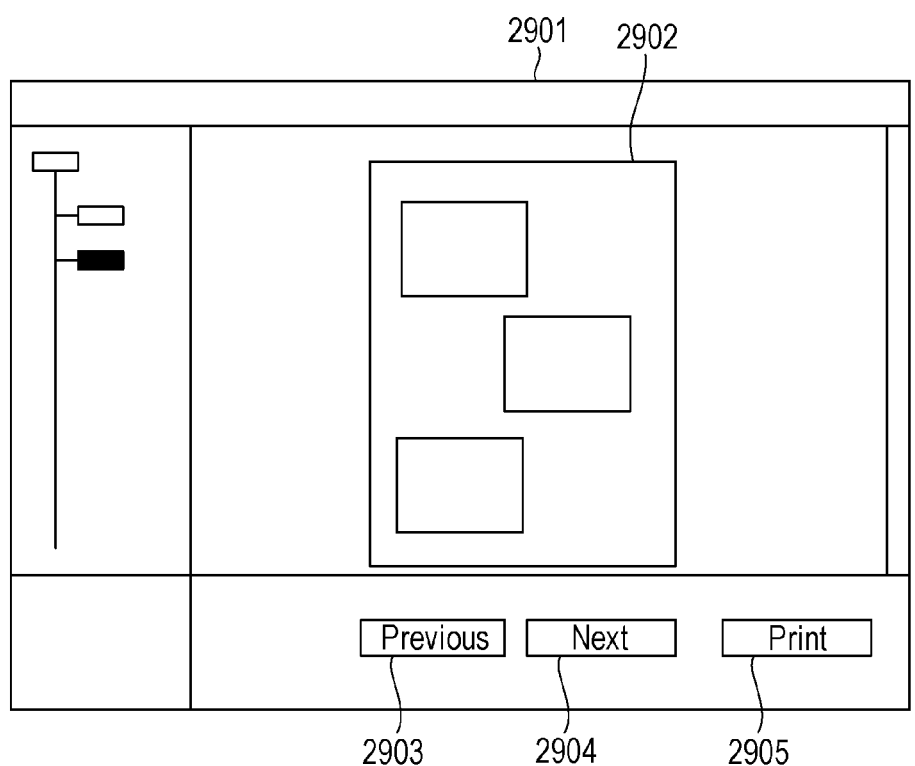
FIG. 16 is a diagram illustrating an example of a displayed result of automatic layout generation according to the first embodiment.

Returning to FIG. 6, the results of the layout obtained by the above process are rendered in S605 illustrated in FIG. 6 and displayed as illustrated in FIG. 16. In S605, first, the layout identifier stored in LayoutList[0] is read, and a temporary layout result corresponding to the identifier is read from the secondary storage device 103 or the RAM 102. As described above, the layout result is provided with template information and an assigned name of an image for each slot included therein. Therefore, the layout result is rendered based on these pieces of information using a rendering function of the OS operating on the information processing apparatus 115, and a layout 2902 illustrated in FIG. 16 is displayed.

In FIG. 16, by pressing a next button 2904, the identifier of LayoutList[1], which has been given the second highest score, is read, and the layout result is rendered and displayed. As a result, the user can view various suggested layouts. In addition, by pressing a previous button 2903, a layout that has been previously displayed can be displayed again. Furthermore, if the user likes a displayed layout, the user can print the layout result 2902 using the printer 112 connected to the information processing apparatus 115 by pressing a print button 2905.

The basic processing procedure according to this embodiment has been described.

Here, a process for updating application software according to this embodiment will be described in detail. More specifically, a case will be described in which, in the application software, a first version, in which the FD1 is mounted as a detection unit, is updated to a second version, in which FD2 is mounted as the detection unit.

Here, a detection algorithm or detection parameters are different between the FD1 and the FD2. Therefore, detection performance including a detection rate of objects and an erroneous detection rate of objects is also different between the two. That is, "different detection performance" in this embodiment refers not to a difference in performance with the same detection characteristics but to different detection characteristics.

As an example of different detection characteristics, a case is possible in which the FD1 and the FD2 are optimized to different operating environments. More specifically, a case is possible in which the FD1 is optimized to an operation on a PC and the FD2 is optimized to an operation on a server connected to a network. The FD2 may, for example, use an algorithm of face detection different from one used by the FD1 and reduce overall processing time by using much internal processing that can be performed in parallel with other types of internal processing and assigning each set of parallel processing to multitask processing.

Figure 18:
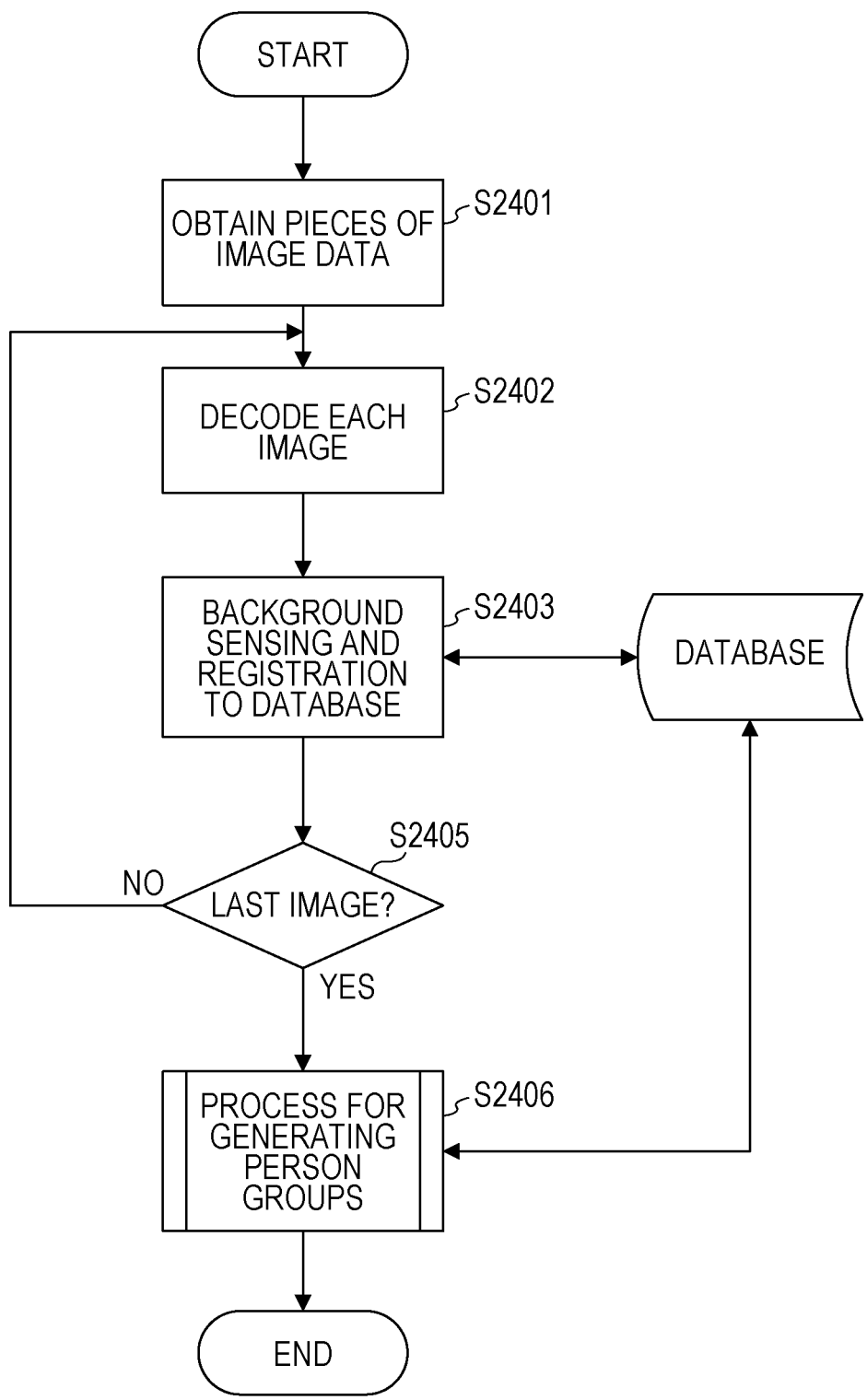
FIG. 18 is a flowchart illustrating the processing procedure of a background analysis according to the first embodiment.

FIG. 18 illustrates a processing procedure of a background analysis after the process for detecting faces is updated to the FD2 in the application software. S2401, S2402, S2405, and S2406 are the same as S301, S302, S305, and S306, respectively, illustrated in FIG. 3, and accordingly description thereof is omitted. That is, the processing procedure is the same as that illustrated in FIG. 3 except for S2403, and therefore only S2403 will be described in detail.

Figure 19:
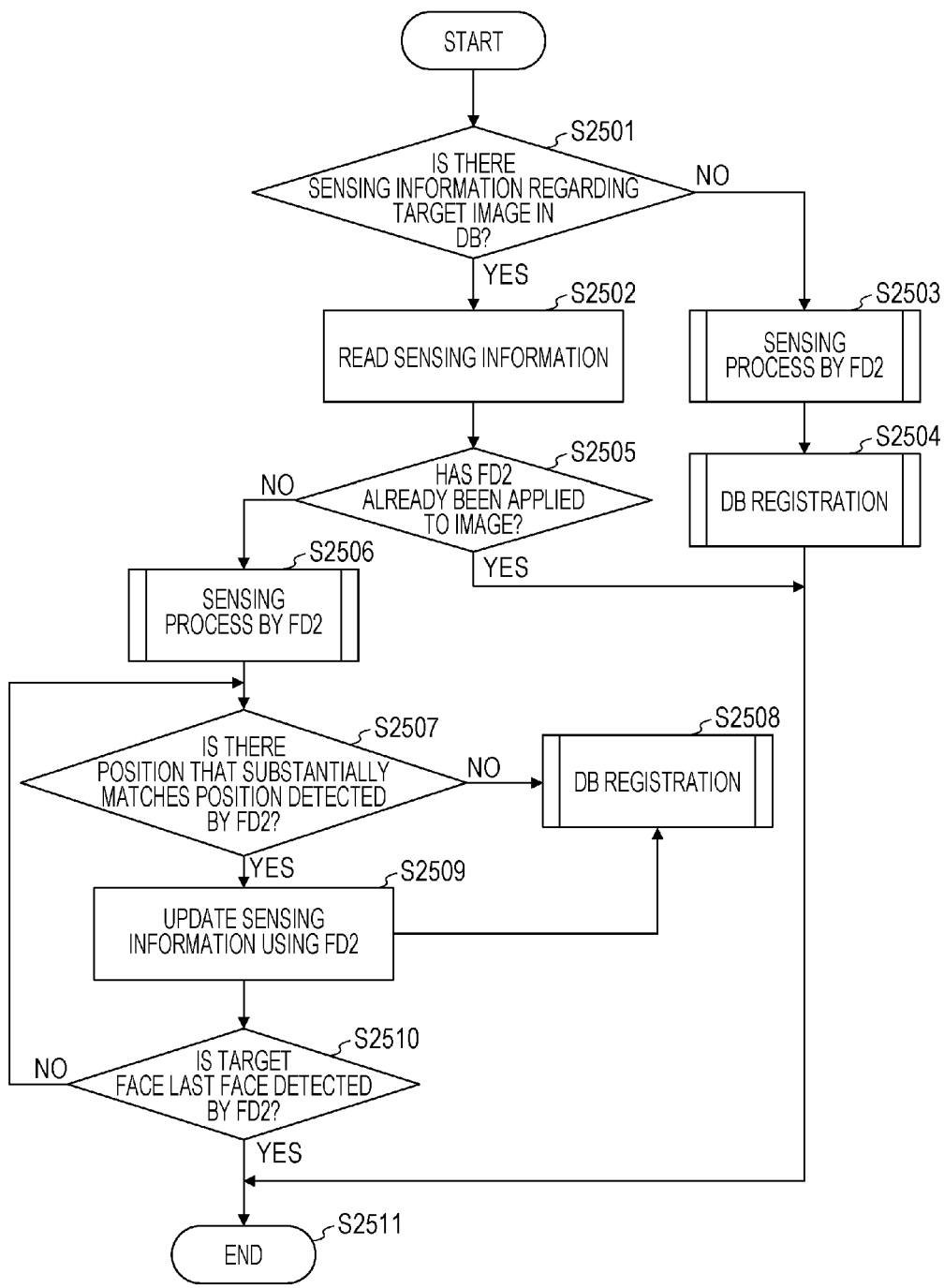
FIG. 19 is a flowchart illustrating the procedure of a sensing process according to the first embodiment.

FIG. 19 illustrates the procedure of the sensing process in S2403.

First, in S2501, the database is asked whether sensing information regarding a current target image already exists. In this embodiment, the database is asked whether the above-described detection information already exists. In other words, whether face detection has already been performed for the current target image is checked. If a result of the check is NO, the process proceeds to S2503. It is to be noted that if the result of the check is NO, sensing information does not exist, which means that the target image is an image for which the sensing process has not been executed.

In S2503, the FD2 performs the image sensing process. Thereafter, results of the sensing are saved to the database (S2504) using a format indicated in List 8 presented below, and the process ends. At this time, since the FD2 has performed face detection, a value of 2, which is connected with the FD2, is described to AppliedFDVersion and FDVersion in the Person tag in the list. In addition, if there are a plurality of faces of persons in the image, the positions of the faces are described in a plurality of Person tags.

[Expression 10]
List.8

```
<?xml version="1.0" encoding="utf-8"?>
<IMAGEINFO>
    <BaseInfo>
        <ID>0x00000001</ID>
        <ImagePath>C:\My Picture\IMG0100.jpg</ImagePath>
        <ImageSize width=3000. height=2000 />
        <CaptureDateTime>20100101:120000<CaptureDateTime>
    </BaseInfo>
    <SensInfo>
        <AveY>122</AveY>
        <AveS>38</AveS>
        <AveH>50</AveH>
        <SceneType>Landscape</SceneType>
        <AppliedFDVersion>2</AppliedFDVersion>
        <Person>
            <ID>0</ID>
            <Reliability>80</Reliability>
            <FDVersion>2</FDVersion>
            <Position>
                <LeftTop x=420. y=200/>
                <LeftBottom x=420. y=300/>
                <RightTop x=520. y=200/>
                <RightBottom x=520. y=300/>
            </Position>
            <AveY>128</AveY>
            <AveCb>-20</AveCb>
            <AveCr>20</AveCr>
        </Person>
        ...
    </SensInfo>
    <UserInfo>
        <FavoriteRate>3</FavoriteRate>
        <ViewingTimes>5</ViewingTimes>
        <PrintingTimes>3</PrintingTimes>
        <Event>Travel</Event>
    </UserInfo>
    ...
</IMAGEINFO>
```

Next, if the result of the check in S2501 is YES, that is, if there is already sensing information regarding the target image in the database (DB), the sensing information is read from the database in S2502. It is to be noted that if the result of the check is YES, the target image is an image for which the sensing process has already been executed, that is, face detection has already been performed.

Next, in S2505, AppliedFDVersion in the sensing information read in S2502 is referred to, and whether the FD2 has already been applied to the image is determined.

If the FD has already been applied to the image, that is, if the FD2 has executed the process for detecting objects, the process ends.

If AppliedFDVersion is smaller than 2, that is, if the sensing by the FD2 has not been performed although sensing has been performed before, the sensing process is performed by the FD2 (S2506). At this time, if there are a plurality of faces of persons in the image, the positions of the plurality of faces are output as results of the detection performed by the FD2.

Next, in S2507, the position of the face detected by the FD2 and the detected positions stored in the database are compared, and whether there is a detected position that substantially matches the position of the face detected by the FD2 in the database is determined. That is, whether the database stores positional information regarding an object region (face region in this embodiment) that substantially matches positional information regarding an object region detected by a new detection unit (FD2 in this embodiment) (whether a previous detection unit (FD1 in this embodiment) has detected substantially the same object region) is determined. Here, a detected position includes a detected region. In this embodiment, a detected region is determined based on positional information regarding a face region, which is a target region. Whether the positional information substantially match is then determined based on the detected regions. For example, if the coordinate position of a region detected by the FD1 in the image is defined by the upper left (100, 100) and the lower right (200, 200), a region detected by the FD1 is obtained based on this coordinate position. Similarly, if the coordinate position of the same region detected by the FD2 is defined by the upper left (101, 101) and the lower right (199, 199), the region detected by the FD2 is obtained based on this coordinate position.

If there are a plurality of faces in the image, whether there is a detected position that matches the detected position of an i-th face detected by the FD2 is determined using j faces described in the Person tags stored in the database. Here, i and j are not necessarily the same because the levels of detection performance of the FD1 and FD2 are different.

In addition, the reason why whether there is a position that "substantially matches" is determined here is that, when the levels of detection performance of the FD1 and the FD2 are different, the coordinate positions might not perfectly match even if the same target region is detected. It is to be noted that when the levels of detection performance are different, it is highly unlikely that the coordinate positions perfectly match. Therefore, in this embodiment, the determination as to whether the regions detected by the two detection units match is not performed strictly in units of pixels but in an approximate manner by including a certain allowance.

Figure 21:
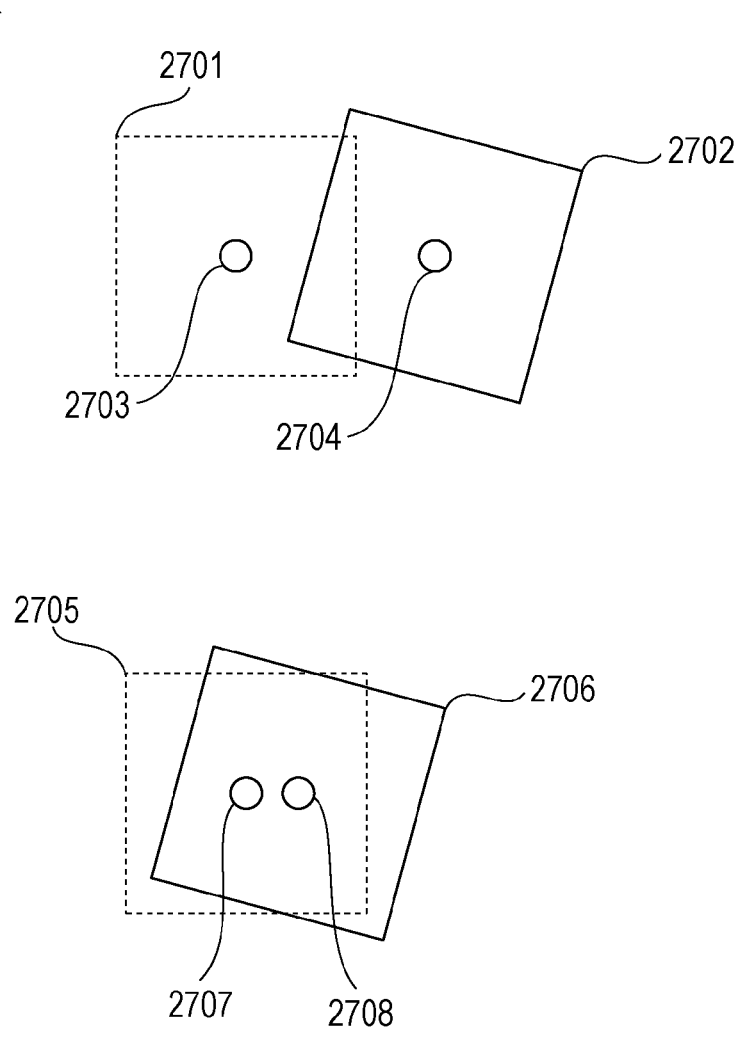
FIG. 21 is a diagram illustrating a process for determining whether regions substantially match according to the first embodiment.

Here, the determination as to whether the regions substantially match will be described with reference to FIG. 21. In FIG. 21, broken lines 2701 and 2705 indicate face detection positions (hereinafter also referred to as face detection regions), and solid lines 2702 and 2706 indicate positions detected by the FD2. In addition, centers of gravity 2703, 2704, 2707, and 2708 correspond to the rectangular regions indicated by the lines 2701, 2702, 2705, and 2706, respectively. In this embodiment, whether two face detection regions substantially match is determined based on whether the centers of gravity of the two face detection regions are included in each other's face detection region.

The centers of gravity 2703 and 2704 are not included in each other's rectangular region. Therefore, it is determined that the regions do not substantially match. This occurs when two persons' faces are close to each other.

On the other hand, the centers of gravity 2707 and 2708 are included in each other's rectangular region. Therefore, it is determined that the regions substantially match.

In addition, the determination as to whether the regions substantially match is not limited to the above-described method. For example, the lengths of diagonals of the rectangular face detection regions may be compared with each other and it may be determined that the regions substantially match if a difference between the lengths of the diagonals is less than N % of the length of either diagonal, instead. Alternatively, it may be determined that the regions substantially match if the difference between the lengths of the diagonals of the rectangular face detection regions is smaller than a certain threshold relative to the length of either diagonal. It is to be noted that N is an arbitrary parameter.

If it is determined in S2507 that there is no position among the j faces in the DB that substantially matches the position of the i-th face detected by the FD2, results of the sensing process are registered to the DB (S2508). In doing so, the i-th region can be determined as a new face region that has not been detected by the FD1.

In addition, if it is determined in S2507 that there is a face among the j Person tags that substantially matches, results of the sensing are updated to values of the FD2 and saved to the DB (S2509). The reason why the values of the results of the sensing are updated in the database is that the FD2, which is obtained by updating the FD1, is likely to have higher detection performance. That is, by giving priority to the results of the sensing performed by the FD2, image processing performance after a face region is used is likely to improve. It is to be noted that if the FD1 has higher detection performance than the FD2, the update to the results obtained by the FD2 is not performed in S2509, and the information obtained by the FD1 may be maintained.

With respect to the face region that has been determined to substantially match in S2509, information indicating that the face region has been detected by both the FD1 and the FD2 may be registered to the database. For example, FDVersion in each Person tag is described as indicated below. In FDVersion, detection information for identifying a detection unit that has detected a position is described, and by referring to FDVersion, whether there are a plurality of detection units that have detected a certain position can be checked.

[Expression 11]
List.9

```
<Person>
    <ID>0</ID>
    <Reliability>85</Reliability>
    <FDVersion>1.2</FDVersion>
    ...
</Person>
```

As a result of the above-described process, the sensing information to be registered to the database, that is, more specifically, information regarding a detected position, is determined. In other words, the detected position of an object in the image is determined again based on results of detection obtained by a plurality of detection units.

According to this embodiment, a plurality of face detection positions obtained with different levels of detection performance can merge, and accordingly results obtained by the FD1 and the FD2 can be utilized without loss. Therefore, the results obtained by both the FD1 and the FD2 can be used in the subsequent layout process.

When the process for detecting faces has been updated and the detection algorithm or the detection parameters are different between the FD1 and the FD2, faces that can be detected by the FD1 can not necessarily be detected by the FD2. Therefore, a problem might arise if face position information detected by the FD1 and stored in the database is all replaced by face position information detected by the new FD2. For example, face information that has been detected by the FD1 and classified as a result of person recognition might not be detected by the FD2 and displayed on a UI. On the other hand, in this embodiment, if a position is detected by both the FD1 and the FD2, results of sensing performed by the FD2 are registered to the database, and if a position is detected only by the FD1, results of sensing performed by the FD1 remain registered in the database. As a result, face information can be certainly displayed in the UI. In addition, for example, when a certain application performs desirable automatic image correction based on the brightness and the color of a detected position of a face, desirable image correction might not be possible if the position of the face is not detected after the update to the FD2. On the other hand, in this embodiment, desirable image correction can be executed.

In addition, in this embodiment, an image subjected to a detection process performed by the FD1 is also subjected to a detection process performed by the FD2. Therefore, if the FD2 has higher detection performance than the FD1, the FD2 can find faces that have not been detected by the FD1 in images to which the FD1 has already been applied.

In addition, in this embodiment, whether to register a detected position to the database based on whether a position detected by the FD1 and a position detected by the FD2 substantially match. Therefore, even if the coordinate positions are slightly different, the same face can be properly detected. In addition, when the FD2 performs the sensing process on images on which the FD1 has performed the sensing process, the amount of processing is enormous. In this embodiment, on the other hand, since the sensing process is executed in the background and the user does not even notice the ongoing process, disadvantages such as process waiting time are avoided.

Thus, by performing the automatic layout process realized by the components 204 to 207 illustrated in FIG. 2 using the database of sensing information obtained by merging results obtained by the FD1 and the FD2, it becomes possible to provide a significantly more precise layout process than a layout process that uses only results obtained by either the FD1 or the FD2.

Second Embodiment

Although the process for updating sensing information in the first embodiment is performed using results obtained by the FD2, whether to update sensing information is determined using reliability values of face detection in this embodiment. It is to be noted that description of the same components as those according to the first embodiment is omitted.

Figure 20:
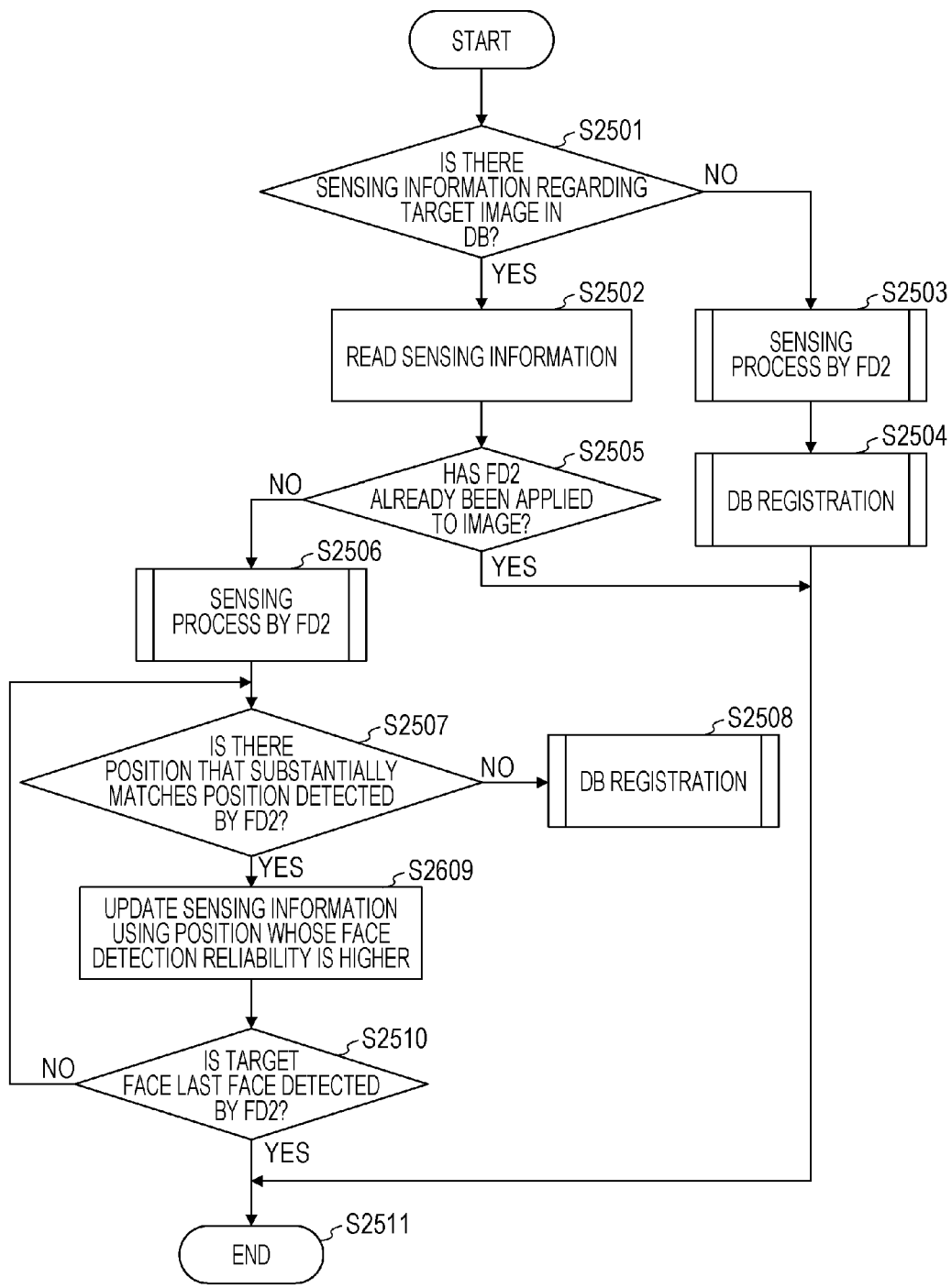
FIG. 20 is a flowchart illustrating the procedure of a sensing process according to a second embodiment.

FIG. 20 illustrates a processing procedure in S2403 according to this embodiment. It is to be noted that, in FIG. 20, the same processing as that illustrated in FIG. 19 described in the first embodiment is given the same reference numerals, and accordingly description thereof is omitted.

As illustrated in FIG. 20, if it is determined in S2507 that there is a detected position in the database that substantially matches the position detected by the FD2, the sensing information is updated using a detected position whose face detection reliability value is higher (S2609). More specifically, with respect to the positions of faces that have been determined in S2507 to substantially match, a reliability value obtained from the FD2 and a reliability value obtained from the FD1 and described in the Reliability tag in the Person tag are compared. It is to be noted that if the ranges of the two reliability values are different from each other, the comparison is made after processing such as normalization is performed as necessary. A result whose reliability value has been determined to be higher as a result of the comparison between the two reliability values is described in the XML format and saved in the DB.

It is to be noted that if it is determined as a result of the comparison that the reliability value of the FD1 is higher, the sensing information in the DB is not updated, but the region has also been detected by the FD2. Therefore, the same content as in List 9 is described in the FDVersion tag.

In this embodiment, when sensing information is merged using a plurality of face detection positions obtained with different levels of performance, a face detection position whose face detection reliability value is higher is saved to the DB.

Therefore, when image processing such as automatic layout, which is performed using the sensing information, is performed, more precise processing can be performed than when results of the sensing obtained by either the FD1 or the FD2 are used.

Third Embodiment

In this embodiment, a process for correcting an image is performed using the DB obtained, as described above, by merging results of the sensing performed by the FD1 and the FD2. It is to be noted that description of the same processing as that according to the first embodiment is omitted.

Figure 22A:
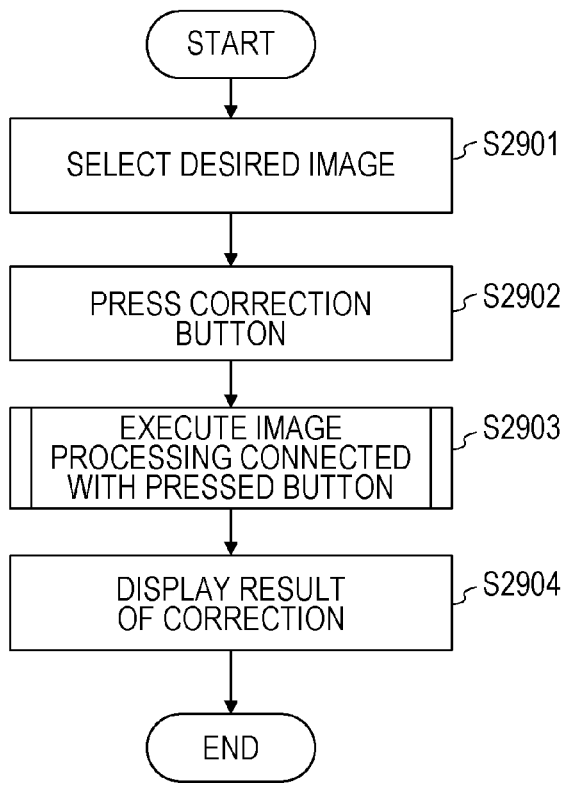
FIG. 22A is a flowchart illustrating a process for correcting an image according to a third embodiment.

FIG. 22A is a flowchart illustrating the process for correcting an image according to this embodiment.

First, in S2901, a desired image is selected (S2901). For example, an arbitrary image is selected in a list of thumbnails such as that illustrated in FIG. 8A. When an arbitrary image has been selected in the list of thumbnails such as that illustrated in FIG. 8A, the selected image is expanded as indicated by an image 2802. In addition, in a display screen 2801 illustrated in FIG. 22B, a plurality of correction buttons for executing image processing that can be applied to the selected image are arranged in a lower part.

Next, if one of the correction buttons is pressed (S2902), image processing connected with the pressed button is executed (S2903). A correction result obtained by executing the image processing is then displayed on the display screen (S2904), and the process ends.

Figure 22B:
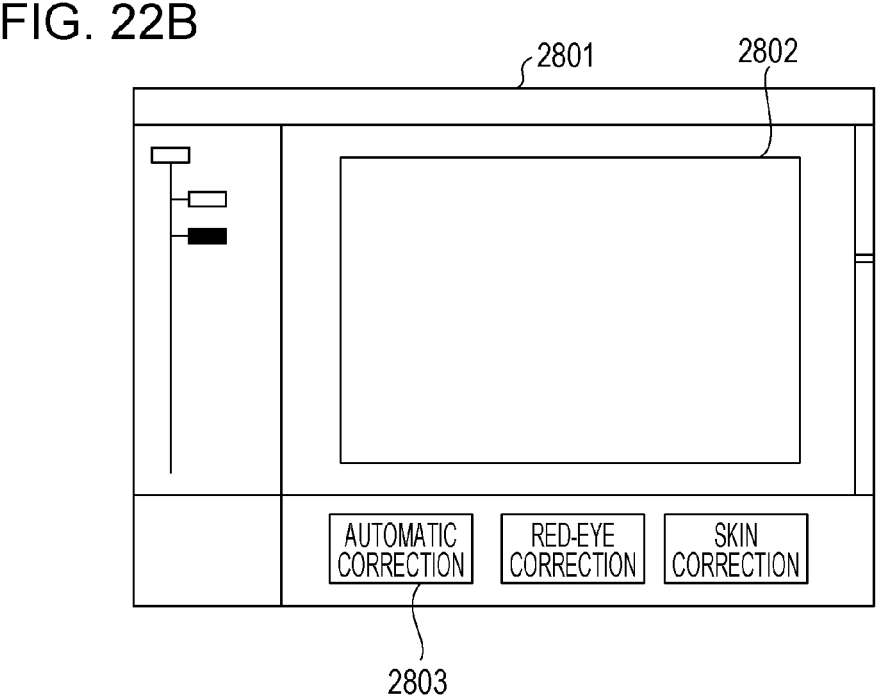
FIG. 22B is a diagram illustrating an example of a displayed selected image.

For example, if an automatic correction button 2803 illustrated in FIG. 22B is pressed (S2902), the process for correcting an image is automatically executed on the selected image (S2903), and a result thereof is displayed (S2904).

Figure 23:
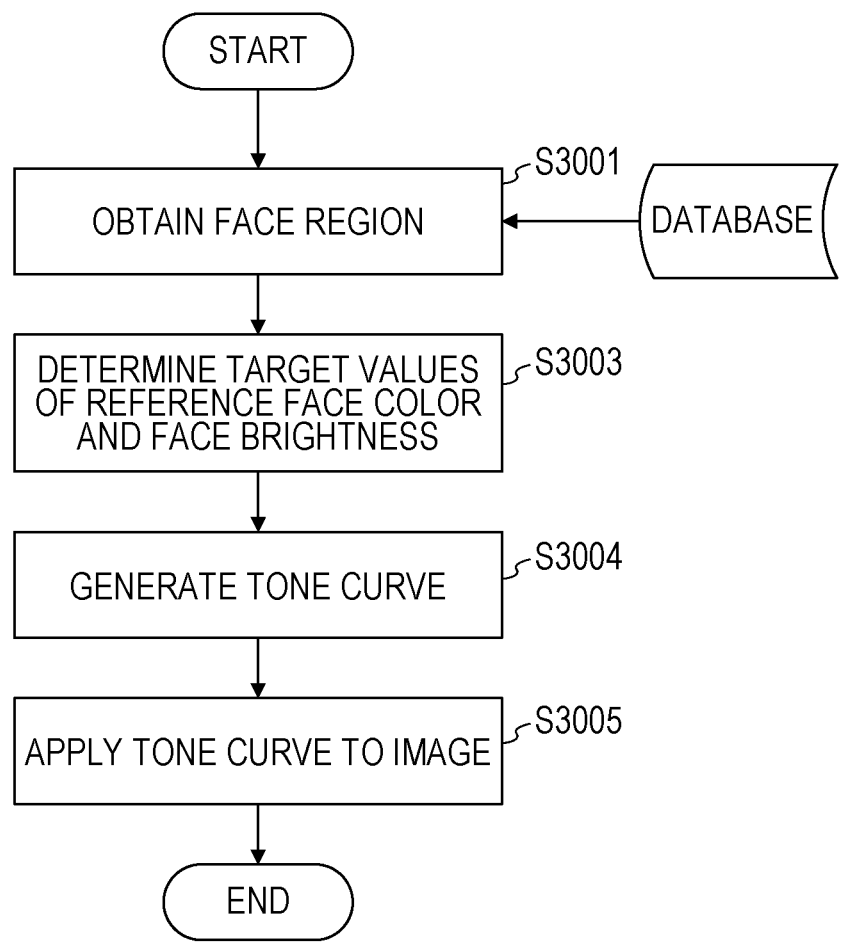
FIG. 23 is a flowchart illustrating the procedure of an automatic correction process according to the third embodiment.

FIG. 23 illustrates the procedure of the automatic correction process according to this embodiment. Here, the brightness of an image is corrected as a result of the automatic correction process.

First, in S3001, the DB is accessed by referring to the file name of a target image, and an XML list of sensing information regarding the target image is obtained. In the sensing information, brightness information regarding a face is already described in the Person tag, and the brightness information is obtained from the sensing information. It is to be noted that if there are a plurality of faces in the target image, a plurality of pieces of brightness information are obtained.

Next, a reference face color and a target value of the brightness of the face are determined based on the obtained brightness information (S3003).

First, the determination of the reference face color FaceYstd before the correction will be described. In this embodiment, FaceYstd is determined based on, in the sensing information obtained from the database, information including a reliability value of the face and information (FDVersion) indicating the number of types of face detection in which the face has been detected.

Here, if the number of faces in the image is assumed to be i, the brightness of each face is included in each of i Person tags and denoted by FaceY[i].

FaceYstd is calculated using the following expression.

$$FaceYstd = \frac{\sum_i W_i \times FaceY[i]}{\sum_i W_i} \quad \text{[Expression 12]}$$

In the above expression, Wi denotes a weighting, which is set as follows.

By referring to FDVersion in the Person tag, W is set to 2.0 if 1 and 2 are described, that is, if both the FD1 and the FD2 have detected the face, and W is set to 1.0 if either the FD1 or the FD2 has detected the face.

By setting the weighting as described above, the reference face color FaceYstd can be detected while giving priority to the brightness of a face that has been detected by a plurality of types of face detection whose levels of performance are different. By performing calculation using the above expression, the reference face color of the original image can be calculated more accurately. This is because a face that has been detected both the FD1 and the FD2 has high reliability whereas a face that has been detected by either the FD1 or the FD2 might have been erroneously detected.

In addition, the method for calculating FaceYstd is not limited to that described above. For example, as described above, a reliability value has been calculated for each face region in the sensing information. The reliability values may be denoted by FaceRe[i], and Wi may be defined in the above expression as follows. That is, W is set to FaceRe[i]×1.2 if 1 and 2 are described, that is, if both the FD1 and the FD2 have detected the face, and W is set to FaceRe[i]×1.0 if either the FD1 or the FD2 has detected the face.

When the weighting has been set as described above, too, a larger weighting is set for a face that has been detected by both the FD1 and the FD2, and therefore FaceYstd can be calculated while giving priority to a face region.

Figure 24A:
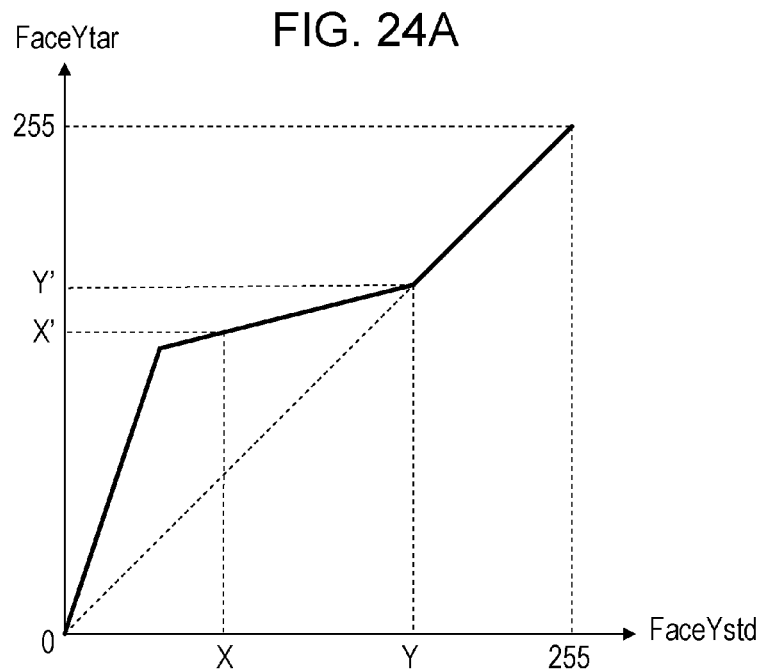
FIG. 24A is a graph illustrating a relationship between FaceYstd and FaceYtar.

Next, in S3003, a target value FaceYtar of the brightness of the face is determined. The target value of the brightness of the face can be calculated from a relationship between FaceYstd and FaceYtar illustrated in FIG. 24A. In FIG. 24A, a horizontal axis represents FaceYstd, and a vertical axis represents FaceYtar. A solid line indicates a relationship between the two.

If FaceYstd is larger than Y, it is determined that the brightness of the face in the original image is sufficient and FaceYstd and FaceYtar are the same, and the correction is not performed.

On the other hand, if FaceYstd is smaller than Y, it is determined that the brightness of the face is lower than in a desirable state, and a target value that increases the brightness is set. It is to be noted that if the brightness of the face is extremely low, the tone of the entirety of the image might get out of balance since the amount of correction of brightness can be extremely large. Therefore, if FaceYstd is extremely low, that is, more specifically, if FaceYstd is lower than X, a low FaceYtar is set.

Figure 24B:
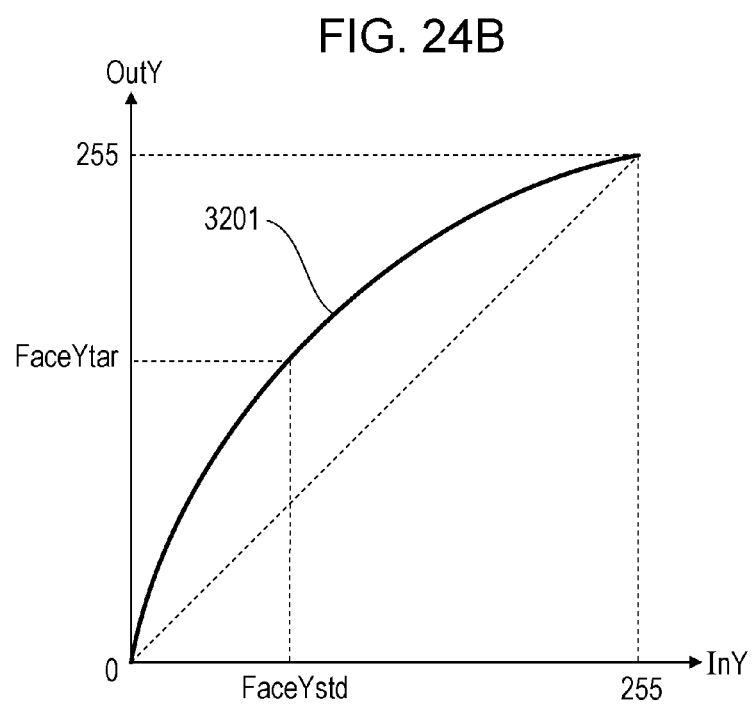
FIG. 24B is a graph illustrating a tone curve.

Next, a luminance tone curve for the correction is generated using the calculated FaceYstd and FaceYtar (S3004). FIG. 24B illustrates a generated luminance tone curve 3201. In FIG. 24B, a horizontal axis represents an input luminance value InY, and a vertical axis represents an output luminance value OutY. In this embodiment, the tone curve is saved in a memory with a certain level of bit accuracy as a one-dimensional lookup table. The following expression is used.

$$OutY = LutY[InY]$$

Next, the tone curve generated in S3004 is applied to each pixel of the image (S3005). The application will be described only briefly since the application is a known technique. First, RGB data regarding each pixel is converted into YCbCr components using a known conversion expression, and a Y value is determined as InY to calculate OutY using the above expression. Resultant OutYCbCr values are returned to RGB components using a known inverse conversion expression. This process is performed for all the pixels of the image, and the process for automatically correcting the image ends.

It is to be noted that the method for applying a tone curve is not limited to that described above, and a known method may be used. For example, a three-dimensional lookup table in an RGB color space that reflects the tone curve illustrated in FIG. 24B may be generated, and the generated three-dimensional lookup table may be applied to each pixel of the image using a known tetrahedral interpolation method.

In this embodiment, face information that has been detected by a plurality of face detection techniques are given priority and reflected in the image processing when the automatic correction of an image is performed using the sensing information. Thus, by controlling image processing parameters such as parameters used for the automatic correction based on detection information indicating whether a target region has been detected by a plurality of detection units, a process can be executed with higher correction accuracy. This is because a region that has been detected by a plurality of face detection techniques whose performance levels are different is highly reliable for being a face region and is not likely a region obtained as a result of erroneous detection.

It is to be noted that although automatic brightness correction is performed as a process for correcting an image in this embodiment, the process for correcting an image is not limited to this. For example, the process for correcting an image may be color balance correction using a face color, dodging correction based on the brightness of a face, or correction based on the state of a face region, such as skin processing for making skin look smooth. In one of these cases, too, the amount of correction may be controlled in the correction process using FDVersion information as in this embodiment.

Fourth Embodiment

In this embodiment, a large number of layouts are quantitatively evaluated in S2108 illustrated in FIG. 12 according to the first embodiment using FDVersion information. It is to be noted that description of the same components as those in the first embodiment is omitted. A list of evaluation values at this time is as indicated in Table 3. In this embodiment, the person matching rate, which is one of the evaluation values, will be described.

In this embodiment, as in the first embodiment, the process proceeds in accordance with the procedure illustrated in FIG. 12. In the course of the process, in S2103, sensing information is obtained from the database for each image as image attribute information. In the sensing information, FDVersion is described in each Person tag.

In S2108, the sensing information is used for determining the person matching rate. Assume that "father" and "son" are specified for a certain slot in PersonGroup specified in XML. At this time, if these two persons are included in an image assigned to the slot, a score of 100 is given as the person matching rate of the slot. If only one of the two persons is included, a score of 50 is given as the person matching rate, and if neither of the two persons is included, a score of 0 is given. At this time, the score is adjusted in this embodiment.

First, with the number of faces included in an image denoted by E, the number of types of face detection (the FD1, the FD2, and so on) applied to the image denoted by F, and the number of values of FDVersion for each face denoted by fe, the following evaluation value is calculated.

$$We = \frac{\sum_e fe}{E \times F} \quad \text{[Expression 13]}$$

In the above expression, for example, if F=2 (two types of face detection, namely the FD1 and the FD2) and E=2 ("father" and "son"), the sum of the numerator in the above expression is 4 at maximum. In addition, if the faces of both "father" and "son" are detected, the sum is 2 at minimum (at least either the FD1 or the FD2 has detected the faces). Therefore We varies from 0.5 to 1.0.

Next, the score is adjusted by multiplying the score by the obtained We. As a result, a maximum person matching rate is obtained if the face has been detected by the plurality of face detection techniques, and the person matching rate is suppressed if the face has been detected only by one of the plurality of face detection techniques.

In addition, the score of the determination of a missing portion caused by trimming may be adjusted using the FDVersion information. As illustrated in FIG. 15C, when the position 2003 of a face in an image is known in the determination of a missing portion caused by trimming, a score of 0 to 100 is calculated in accordance with the area of the missing portion. If the area of the missing portion is 0, a score of 100 is given, and if the entirety of the face region is missing, a score of 0 is given. At this time, in this embodiment, the score may be adjusted by multiplying the score calculated as a result of the determination of a missing portion by We.

By multiplying the score by the obtained We, a maximum score is given as a result of the determination of a missing portion if the face has been detected by the plurality of face detection techniques and the score is suppressed if the face has been detected only by one of the plurality of face detection techniques.

In this embodiment, the quantitative evaluation of the layouts in S2108 is performed using the above-described evaluation values. In S2109, layouts having highest total scores are selected as top layouts in the layout list.

In this embodiment, the layout evaluation values are controlled in such a way as to give priority to desired face regions that have been detected by a plurality of face detection techniques whose performance levels are different. As a result, a more desirable, more precise automatic layout process than when only one face detection technique is performed can be realized.

Other Embodiments

According to the above-described embodiments, positional information regarding a target position in an image can be determined based on positional information regarding target positions in the image detected by a plurality of detection units for the image.

Although the embodiments of the present invention have been described above, the basic configuration of the present invention is not limited to those described above. The embodiments described above are merely some ways of producing the advantageous effects of the present invention, and if the same advantageous effects as those of the present invention can be produced by using other similar methods or different parameters, such methods or parameters are included in the scope of the present invention.

The determination in S2507 as to whether the regions substantially match is not limited to that described above. The determination as to whether the regions substantially match may be made by calculating a substantial matching rate based on distances between corners of rectangular regions obtained by the FD1 and the FD2. For example, the coordinates of an upper-left corner of a rectangular face region detected by the FD1 are denoted by (LT1x, LT1y), and the coordinates of a lower-right corner are denoted by (RB1x, RB1y). In addition, the coordinates of an upper-left corner of a rectangular face region detected by the FD2 are denoted by (LT2x, LT2y), and the coordinates of a lower-right corner are denoted by (RB2x, RB2y). An average value of differences between the two can be calculated using the following expression.

$$AveDiff = \frac{\sqrt{(LT1x-Lt2x)^2+(LT1y-LT2y)^2} + \sqrt{(RB1x-RB2x)^2+(RB1y-RB2y)^2}}{2}$$ [Expression 14]

The average value of the differences between the distances between the corners of the rectangular regions obtained by the FD1 and the FD2 obtained using the above expression is compared with the length of a diagonal of the rectangular face region, and if a result is lower than or equal to a certain ratio (M %), it may be determined that the two rectangular regions substantially match. Here, M is an arbitrary parameter. It is to be noted that although an example has been described in which only the two corners of each rectangular regions obtained as a result of the face detection are used for determining whether the regions substantially match, the present invention is not limited to this. The determination may be made using all corners or three corners, instead.

In addition, whether the regions substantially match may be determined, for example, based on an overlap area of the detected regions. FIG. 25 is a diagram schematically illustrating regions detected by the FD1 and regions detected by the FD2. In FIG. 25, circles 3301 and 3304 indicated by broken lines are circles inscribed in rectangular regions detected by the FD1, and circles 3302 and 3305 indicated by solid lines are circles inscribed in rectangular regions detected by the FD2. For example, the coordinates of the center and the radius of the circle 3301 are denoted by (C1x, C1y) and R1, respectively, and the coordinates of the center and the radius of the circle 3302 are denoted by (C2x, C2y) and R2, respectively. If a current target pixel position (x, y) is included in both the inscribed circles, the following expressions including the above coordinate positions are satisfied.

<Circle 3301>

$$(C1x-x)^2+(C1y-y)^2<R1$$ [Expression 15]

<Circle 3302>

$$(C2x-x)^2+(C2y-y)^2<R2$$ [Expression 16]

A pixel that satisfies both the conditions is included in both the inscribed circles, that is, the pixel is located in a region 3203 or a region 3306 illustrated in FIG. 25. If a ratio of such pixels to the area of the original circle (may be either of the circles or an average of the circles) is equal to or higher than L %, it is determined that the two regions substantially match. It is to be noted that L is an arbitrary parameter. By using such a method, the ratio of pixels for satisfying the two conditions becomes low if the overlap area is small as in the case of the region 3203, and therefore it is possible to determine that the two regions do not substantially match. On the other hand, if the overlap area is large as in the case of the region 3306, the ratio of pixels for satisfying the two conditions becomes high.

Although a detection unit that has detected a face region is identified based on the FDVersion tag in the above embodiments, the method for identifying a detection unit is not limited to this. For example, a detection unit may be identified by referring to a timestamp. That is, if the time of the detection of a face region is earlier than the time of the update of the application, it may be determined that the face region has been detected by a detection unit that had been used before the update.

In addition, although a position of a face detected by the FD2 is registered to the database (S2508) if there is no detected position that substantially matches the foregoing detected position in the database in the above embodiments, the method for registering a detected position is not limited to this. For example, only results that have been detected by both the FD1 and the FD2 may be registered to the database.

Although an example has been described in the above embodiments in which the application software is updated in terms of the operating environment of the applications, the content of the update of the application software is not limited to this. The same advantageous effects can be produced even if a detection unit is updated to another detection unit in order to improve performance, that is, for example, even if a detection unit that uses an algorithm based on a template matching method is updated to a detection unit that uses an AdaBoost method.

Furthermore, although whether detected positions of faces substantially match is determined based on detected regions in the above embodiments, the method for making the determination is not limited to this. For example, when an organ is detected, it may be determined that detected positions substantially match if a difference between the positions of organs falls within a certain range.

In addition, although an example has been described in the above embodiments in which an object is a person, the object is not limited to a person. The object may be a pet such a dog or a cat, or may be a building or a small article.

In this case, by detecting a pet such as a dog or a cat through a process for detecting a pet, a pet can be set as the object. Alternatively, by detecting a building or a small article through a process for detecting a shape, such as edge detection, a building or a small article can be set as the object. In any case, image processing can be performed using a similar method to that in the above embodiments.

Although an example has been described in the above embodiments in which an image processing apparatus is a computer, the image processing apparatus is not limited to a computer. For example, the present invention may be applied to an apparatus that performs image processing, such as a printer, a copier, a facsimile apparatus, a mobile phone, a personal digital assistant (PDA), an image viewer, or a digital camera.

In addition, the present invention may be applied to a system including a plurality of apparatuses (for example, a host computer, an interface device, a reader, a printer, and the like), or may be applied to an apparatus including a single device (for example, a printer, a copier, a facsimile apparatus, or the like).

Each of the above embodiments can be realized by executing the following process. That is, each of the above embodiments can be realized by executing a process executed when software (program) that realizes the functions of each of the above embodiments is supplied to a system or an apparatus through a network or one of various storage media and reading the program using a computer (a CPU, a microprocessor unit (MPU), or the like) of the system or the apparatus. In addition, the program may be executed by a single computer or a combination of a plurality of computers. In addition, the entirety of the above-described processing need not be realized by the software, and part or the entirety of the processing may be realized by hardware.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137060, filed Jun. 28, 2013, which is hereby incorporated by reference herein in its entirety.

What is claimed is:

1. An apparatus for using in an operating environment that includes a holding unit and a first detection unit, the apparatus comprising:
   an acquiring unit configured to acquire a target image;
   an obtaining unit configured to obtain, from the holding unit, positional information regarding a target region in the target image obtained by the first detection unit;
   a second detection unit configured to have detection characteristics different from detection characteristics of the first detection unit and detect positional information regarding a target region in the target image;
   a determination unit configured to determine whether the positional information of the target image obtained by the obtaining unit includes positional information which substantially matches the positional information of the target image detected by the second detection unit; and
   a control unit configured to cause, if the positional information of the target image obtained by the obtaining unit includes positional information which substantially matches the positional information of the target image detected by the second detection unit, the holding unit to either continue to hold, as positional information regarding a target region in the target image, the information obtained by the obtaining unit or newly to hold, as positional information regarding a target region in the target image, the positional information of the target image detected by the second detection unit,
   wherein the control unit configured to cause, if the positional information of the target image obtained by the obtaining unit does not include positional information which substantially matches the positional information of the target image detected by the second detection unit, to hold as positional information regarding a target region in the target image, the positional information of the target image detected by the second detection unit,
   wherein the acquiring unit, the obtaining unit, the second detection unit, determination unit, and the control unit are implemented by at least one processor in the apparatus.

2. The apparatus according to claim 1,
   wherein, if the positional information obtained by the obtaining unit includes positional information which substantially matches the positional information detected by the second detection unit, the control unit updates the positional information held by the holding unit by using the positional information regarding the target region in the target image detected by the second detection unit.

3. The apparatus according to claim 1,
   wherein the determination unit determines whether the positional information obtained by the obtaining unit includes positional information which substantially matches the positional information detected by the second detection unit based on whether both a position of a center of gravity of the target region detected by the first detection unit is included in the target region detected by the second detection unit and a center of gravity of the target region detected by the second detection unit is included in the target region detected by the first detection unit.

4. The apparatus according to claim 1,
wherein the determination unit determines whether the positional information obtained by the obtaining unit includes positional information which substantially matches the positional information detected by the second detection unit based on whether a difference between positions of the target regions detected by the both of detection units is smaller than a threshold.

5. The apparatus according to claim 1,
wherein the control unit causes the holding unit to hold detection information indicating whether each target region in the target image has been detected by both of the detection units.

6. The apparatus according to claim 1,
wherein the target regions in the target image are object regions in the target image.

7. The apparatus according to claim 1, further comprising:
an image processing unit configured to execute image processing based on the positional information regarding the target region in the target image held by the holding unit.

8. The apparatus according to claim 7,
wherein, in the image processing, an image processing parameter is controlled based on detection information indicating whether each target region in the target image has been detected by both of the detection units.

9. The apparatus according to claim 7,
wherein certain image processing is an automatic process for correcting the target image.

10. The apparatus according to claim 7,
wherein certain image processing is an automatic layout process.

11. The apparatus according to claim 1, wherein, if the positional information obtained by the obtaining unit does not include positional information which substantially matches the positional information detected by the second detection unit, the control unit causes the holding unit to hold the positional information detected by the second detection unit as the positional information regarding the target region in the target image.

12. The apparatus according to claim 1, wherein the control unit causes the holding unit to hold information of a detection unit which detects positional information held by the holding unit.

13. The apparatus according to claim 1, wherein a detection algorithm or detection parameters are different between the first detection unit and the second detection unit.

14. The apparatus according to claim 1, wherein the first detection unit and the second detection unit are optimized to different operating environments.

15. The apparatus according to claim 1, wherein the second detection unit detects positional information regarding the target region in the target image, if the holding unit does not hold any positional information of the target image.

16. The apparatus according to claim 1, wherein the control unit causes the holding unit to hold the positional information regarding the target region detected by the second detection unit as the positional information regarding the target region in the target image, if the holding unit does not hold any positional information of the target image.

17. The apparatus according to claim 1, wherein the control unit updates, if the positional information of the target image obtained by the obtaining unit includes positional information which substantially matches the positional information of the target image detected by the second detection unit, the positional information held by the holding unit by using positional information which is detected by a detection unit having higher reliability among the first and second detection units.

18. A method comprising:
acquiring a target image;
obtaining, from a holding unit, positional information regarding a target region in the target image obtained by a first detection unit;
detecting, by a second detection unit, positional information regarding a target region in the target image, the second detection unit configured to have detection characteristics different from detection characteristics of the first detection unit;
determining whether the positional information of the target image obtained by the obtaining includes positional information which substantially matches the positional information of the target image detected by the second detection unit;
causing, if the positional information of the target image obtained in the obtaining includes positional information which substantially matches the positional information of the target image detected in the detecting, the holding unit to hold, as positional information regarding a target region in the target image, either the information obtained in the obtaining or the positional information detected in the detecting; and
causing, if the positional information of the target image obtained in the obtaining does not include positional information which substantially matches the positional information of the target image detected in the detecting, the holding unit to hold as positional information regarding a target region in the target image, the positional information detected in the detecting.

19. The method according to claim 18, wherein, if the positional information of the target image obtained by the obtaining unit includes positional information which substantially matches the positional information of the target image detected by the second detection unit, the positional information held by the holding unit is updated by using the positional information detected by the second detection unit.

20. The method according to claim 18, wherein a detection algorithm or detection parameters are different between the first detection unit and the second detection unit.

21. The method according to claim 18,
wherein the determining determines whether the positional information of the target image obtained by the obtaining unit includes positional information which substantially matches the positional information of the target image detected by the second detection unit further based on whether both a position of a center of gravity of the target region detected by the first detection unit is included in the target region detected by the second detection unit and a center of gravity of the target region detected by the second detection unit is included in the target region detected by the first detection unit.

22. A non-transitory computer-readable recording medium storing a program for causing a computer to execute a method, the method comprising:
acquiring a target image;
obtaining, from a holding unit, positional information regarding a target region in the target image obtained by a first detection unit;
detecting, by a second detection unit, positional information regarding a target region in the target image, the second detection unit configured to have detection characteristics different from detection characteristics of the first detection unit;

determining whether the positional information of the target image obtained by the obtaining includes positional information which substantially matches the positional information of the target image detected by the second detection unit;

causing, if the positional information obtained in the obtaining includes positional information which substantially matches the positional information of the target image detected in the detecting, the holding unit to hold, as positional information regarding a target region in the target image, either the information obtained in the obtaining or the positional information detected in the detecting; and causing, if the positional information of the target image obtained in the obtaining does not include positional information which substantially matches the positional information of the target image detected in the detecting, the holding unit to hold as positional information regarding a target region in the target image, the positional information detected in the detecting.

23. The non-transitory computer-readable recording medium according to claim 22, wherein, if the positional information of the target image obtained by the obtaining unit includes positional information which substantially matches the positional information of the target image detected by the second detection unit, the positional information held by the holding unit is updated by using the positional information of the target image detected by the second detection unit.

24. The non-transitory computer-readable recording medium according to claim 22, wherein a detection algorithm or detection parameters are different between the first detection unit and the second detection unit.

25. The non-transitory computer-readable recording medium according to claim 22, wherein the determining determines whether the positional information of the target image obtained by the obtaining unit includes positional information which substantially matches the positional information of the target image detected by the second detection unit further based on whether both a position of a center of gravity of the target region detected by the first detection unit is included in the target region detected by the second detection unit and a center of gravity of the target region detected by the second detection unit is included in the target region detected by the first detection unit.

* * * * *